US010347081B2

(12) United States Patent
Walker et al.

(10) Patent No.: US 10,347,081 B2
(45) Date of Patent: Jul. 9, 2019

(54) METHOD AND APPARATUS FOR CONDUCTING FOCUS GROUPS USING NETWORKED GAMING DEVICES

(71) Applicant: IGT, Las Vegas, NV (US)

(72) Inventors: Jay S. Walker, Ridgefield, CT (US); James A. Jorasch, Stamford, CT (US); Daniel E. Tedesco, Westport, CT (US); Geoffrey M. Gelman, Stamford, CT (US); Steven M. Santisi, Stamford, CT (US); Scott Wolinsky, Danbury, CT (US); William P. Van Vooren, Norwalk, CT (US); Andrew P. Golden, Stamford, CT (US); Timothy A. Palmer, Stamford, CT (US)

(73) Assignee: IGT, Las Vegas, NV (US)

( * ) Notice: Subject to any disclaimer, the term of this patent is extended or adjusted under 35 U.S.C. 154(b) by 719 days.

(21) Appl. No.: 15/145,507

(22) Filed: May 3, 2016

(65) Prior Publication Data

US 2016/0247356 A1 Aug. 25, 2016

Related U.S. Application Data

(63) Continuation of application No. 13/796,722, filed on Mar. 12, 2013, now abandoned, which is a (Continued)

(51) Int. Cl.
*G06Q 30/06* (2012.01)
*G07F 17/32* (2006.01)

(52) U.S. Cl.
CPC ...... *G07F 17/3244* (2013.01); *G07F 17/3237* (2013.01); *G07F 17/3272* (2013.01)

(58) Field of Classification Search
USPC ........... 705/7.11; 715/202, 204; 348/333.05, 348/14.07
See application file for complete search history.

(56) References Cited

U.S. PATENT DOCUMENTS 5,249,800 A 10/1993 Hilgendorf et al.
5,259,613 A 11/1993 Marnell, II
(Continued)

OTHER PUBLICATIONS

Author Unknown; advertain.com Launches Program to Award Prizes to Consumers for Opinions on Ads; PR Newswire; Financial News Section; Apr. 13, 2000.
(Continued)

*Primary Examiner* — Akiba K Allen
(74) *Attorney, Agent, or Firm* — Neal, Gerber & Eisenberg LLP

(57) ABSTRACT

The invention includes a system and method for conducting a focus group via networked gaming devices. A slot server or a third party server in communication with gaming devices provides access to players operating the gaming devices. A topic for the focus group's discussion is received from a marketer via a marketer terminal in communication with the slot server. The system identifies players currently operating gaming devices who also are suitable potential participants in the focus group based on a focus group pool definition received from the marketer. Those players that accept an invitation to participate, become participants. The topic is communicated to the participants and the participants comments are relayed back to a moderator who controls the focus group discussion via a moderator terminal (and a graphical user interface) also in communication with the slot server. The moderator (and/or the system) verifies that each of the participants is in fact participating in the focus group and compensation is provided to the participants via the gaming devices.

16 Claims, 13 Drawing Sheets

Related U.S. Application Data continuation of application No. 09/709,235, filed on Nov. 10, 2000, now abandoned.

(60) Provisional application No. 60/208,359, filed on May 31, 2000.

(56) References Cited

U.S. PATENT DOCUMENTS

| | | | |
|---|---|---|---|
| 5,283,734 | A | 2/1994 | Von Kohorn |
| 5,374,952 | A | 12/1994 | Flohr |
| 5,397,133 | A | 3/1995 | Penzias |
| 5,429,361 | A | 7/1995 | Raven et al. |
| 5,470,079 | A | 11/1995 | LeStrange et al. |
| 5,619,558 | A | 4/1997 | Jheeta |
| 5,655,961 | A | 8/1997 | Acres et al. |
| 5,702,304 | A | 12/1997 | Acres et al. |
| 5,741,183 | A | 4/1998 | Acres et al. |
| 5,759,101 | A | 6/1998 | Von Kohorn |
| 5,752,882 | A | 9/1998 | Acres et al. |
| 5,820,459 | A | 10/1998 | Acres et al. |
| 5,823,879 | A | 10/1998 | Goldberg et al. |
| 5,836,817 | A | 11/1998 | Acres et al. |
| 5,876,284 | A | 3/1999 | Acres et al. |
| 5,893,075 | A | 4/1999 | Plainfield et al. |
| 5,941,772 | A | 8/1999 | Paige |
| 5,971,271 | A | 10/1999 | Wynn et al. |
| 5,971,850 | A | 10/1999 | Liverance |
| 5,974,398 | A | 10/1999 | Hanson et al. |
| 6,003,013 | A | 12/1999 | Boushy et al. |
| 6,206,782 | B1 | 3/2001 | Walker et al. |
| 6,364,769 | B1 * | 4/2002 | Weiss ...................... G07F 17/32 463/16 |
| 6,578,735 | B1 | 6/2003 | Mothwurf |
| 6,587,127 | B1 | 7/2003 | Leeke et al. |
| 6,863,606 | B1 | 3/2005 | Berg et al. |
| 7,016,861 | B2 | 3/2006 | Mothwurf |
| 7,025,674 | B2 | 4/2006 | Adams et al. |
| 7,072,863 | B1 | 7/2006 | Phillips et al. |
| 2001/0004607 | A1 | 6/2001 | Olsen |
| 2001/0034643 | A1 | 10/2001 | Acres |
| 2003/0083943 | A1 | 5/2003 | Adams et al. |
| 2003/0103644 | A1 | 6/2003 | Klayh |
| 2003/0115102 | A1 | 6/2003 | Mothwurf |
| 2005/0033642 | A1 | 2/2005 | Mothwurf |
| 2006/0143085 | A1 | 6/2006 | Adams et al. |
| 2006/0183529 | A1 | 8/2006 | Acres |
| 2007/0050256 | A1 | 3/2007 | Walker et al. |

OTHER PUBLICATIONS

Author Unknown; “Greenfield Online-Leading The Research Revolution—Frequently Asked Duestions”; (http://www.greenfieldonline.com/memberservices/faq.htm); download date May 8, 2000.

Author Unknown; “Speedback-Online Focus Groups—Speedback Marketing Research and Consulting”; (http://www.speedback.com/survey focus groups.htm). download date May 8, 2000.

Author Unknown; “Sodak-Visions Series and Igames”; Sodack Gaming Inc.

Wagner, Mary, “How To Conduct Online Focus Groups: Start by Adjusting Expectations, Experienced Researchers Say,” Business Marketing, Oct. 1, 1999, News Section at p. 10.

Whitemore, Stuart; “Sharing Photographs With Fmaily and Friends Around The Works Is Easy. Just Create an Online Photo Album,” Asiaweek; Apr. 28, 2000.

* cited by examiner

210

| PLAYER IDENTIFIER 700 | NAME 702 | FINANCIAL ACCOUNT IDENTIFIER 704 | DEMOGRAPHIC 706 | MACHINE IDENTIFIER 708 | RATE OF PLAY 710 |
|---|---|---|---|---|---|
| 111123P | SAM BROWN | 1111-1111-1111-1111 | MALE, AGE 23 | 234M | 6 PLAYS/MIN |
| 222234P | LINDA JONES | 2222-2222-2222-2222 | FEMALE, AGE 47 | 532M | 10 PLAYS/MIN |

| DURATION OF PLAY 712 | PROJECTED THEORETICAL WIN 714 | HISTORICAL THEORETICAL WIN 716 | CASINO ACTUAL WIN/LOSS 718 | PRIOR FOCUS GROUPS 720 |
|---|---|---|---|---|
| 1:05 | $58 | $252 | $26 | 3859F, 4831F |
| 2:58 | $63 | $105 | $44 | 2392F |

FIG. 7

212

| GROUP IDENTIFIER 800 | DATE/TIME 802 | MARKETER 804 | MODERATOR 806 | TOPIC 808 | FOCUS GROUP POOL DEFINITION 810 | FOCUS GROUP DURATION 812 | |
|---|---|---|---|---|---|---|---|
| 1000F | 1/23/2003 4:05 PM | 423M | SAMUEL JOHNSON | GENETICALLY MODIFIED FOODS | 50 PEOPLE, AGED 21-35 | 60 MINUTES | |
| 1001F | 1/23/2003 5:05 PM | 779M | TRACY JONES | MOTORIZED STROLLERS | 25 PEOPLE, FEMALE, ONLY CHILD, AGED 35-45 | 35 MINUTES | |
| 4563F | PENDING | 889M | JACK LOPEZ | WETLAND DEVELOPMENT | 10 PEOPLE AT A TIME, 50 PEOPLE TOTAL, AGED 30-50 | 20 MINUTES | |

| | DELIVERABLE 814 | COMPENSATION TO EACH PARTICIPANT 816 | MAXIMUM DISCRETIONARY PAYMENT 818 | RULES FOR AWARDING COMPENSATION 820 | PRICE OF FOCUS GROUP 822 | HAS MARKETER PAID? 824 |
|---|---|---|---|---|---|---|
| | TRANSCRIPT OF THE FOCUS GROUP | $20 | $100 | $2/COMMENT UP TO MAXIMUM DISCRETIONARY | $3000 | YES |
| | VIDEO OF EACH FOCUS GROUP PARTICIPANT | $20 | $300 | $10 + $1/COMMENT UP TO MAXIMUM DISCRETIONARY | $2000 | NO |
| | SUMMARY OF FOCUS GROUP OPINION | $10 | $250 | $10 | $1500 | N/A |

FIG. 8

214

| MARKETER IDENTIFIER 900 | NAME 902 | FINANCIAL ACCOUNT IDENTIFIER 904 |
|---|---|---|
| 251M | BIOBRANCHEX | 3333-3333-3333-3333 |
| 693M | STROLLMOTOR | 4444-4444 4444-4444 |

FIG. 9

216

| COMMENT IDENTIFIER 1000 | PLAYER IDENTIFIER 1002 | GROUP IDENTIFIER 1004 | TIME 1006 | STIMULUS 1008 | COMMENTS 1010 |
|---|---|---|---|---|---|
| 46475C | 123456P | 5555F | 4:09 PM | MODERATOR QUESTION NO. 87921Q | I WOULD BE SCARED THAT THE MOTOR MIGHT HURT THE BABY ... WOULD THE MOTOR BE QUIET ENOUGH TO LET THE BABY SLEEP? |
| 49742C | 234567P | 5555F | 4:10PM | COMMENT NO. 46475C | I AGREE |
| 49743C | 345678P | 6666F | 10:12AM | NONE | I'M ALL FOR GENETICALLY ENGINEERED FOODS. WE NEED TO MAXIMIZE OUR FOOD PRODUCTION TO FEED THE GROWING POPULATION OF THE WORLD |

FIG. 10

METHOD AND APPARATUS FOR CONDUCTING FOCUS GROUPS USING NETWORKED GAMING DEVICES

PRIORITY CLAIM

This application is a continuation of, claims priority to and the benefit of U.S. patent application Ser. No. 13/796,722, filed on Mar. 12, 2013, which is a continuation of, claims priority to and the benefit of U.S. patent application Ser. No. 09/709,235, filed on Nov. 10, 2000, which claims priority to and the benefit of U.S. Provisional Patent Application No. 60/208,359, filed on May 31, 2000, the entire contents of each are incorporated by reference herein.

CROSS-REFERENCE TO RELATED APPLICATIONS

This application is related to commonly owned, co-pending U.S. patent application Ser. No. 09/540,498 filed Mar. 31, 2000, entitled "Method and Apparatus For Administering A Survey Via A Computer Network"; commonly owned, co-pending U.S. patent application Ser. No. 09/282,128, filed Mar. 31, 1999, entitled "Method and Apparatus for Administering A Survey Via A Television Transmission Network"; commonly owned, co-pending U.S. patent application Ser. No. 09/537,253, filed Mar. 29, 2000, entitled "Method and Apparatus for Providing Anonymous Service Provider Access"; commonly owned, co-pending U.S. Pat. No. 6,093,026, filed Jul. 6, 1998, entitled "Method and Apparatus For Administering A Survey"; commonly owned, co-pending U.S. patent application Ser. No. 09/152,905, filed Sep. 14, 1998, entitled "Vending Machine Method And Apparatus For Encouraging Participation In A Marketing Effort"; commonly owned, co-pending U.S. patent application Ser. No. 08/820,499, filed Mar. 19, 1997, entitled "System And Method For Telemarketing Presentations"; commonly owned, co-pending U.S. patent application Ser. No. 09/316,546, filed May 21, 1999, entitled "Method and Apparatus For Processing Credit Card Transactions"; commonly owned, co-pending U.S. patent application Ser. No. 09/205,663, filed Dec. 4, 1998, entitled "Method and System For Utilizing A Psychographic Questionnaire In A Buyer-Driven Commerce System"; commonly owned U.S. patent Ser. No. 08/821,437 filed Mar. 21, 1997, entitled "Free Long Distance Calls On Slot Machines"; commonly owned, co-pending U.S. patent application Ser. No. 08/885,157, filed Jun. 30, 1997, entitled "Electronic Gaming Device Offering A Game Of Knowledge For Enhanced Payouts"; commonly owned, co-pending U.S. patent application Ser. No. 09/152,402, filed Sep. 14, 1998, entitled "System and Method For Facilitating Casino Team Play"; commonly owned, U.S. Pat. No. 6,012,983, filed Dec. 30, 1996, entitled "Automated Play Gaming Device"; and commonly owned, co-pending U.S. patent application Ser. No. 09/609,147, filed Jun. 30, 2000, entitled "Method And Apparatus For Compensating Participation In Marketing Research," all of which are incorporated herein by reference in their entirety for all purposes.

FIELD OF THE INVENTION

The present invention relates to methods and apparatus for performing market and/or opinion research. More specifically, the present invention relates to conducting focus groups via a network.

BACKGROUND OF THE INVENTION

As a result of increasingly competitive markets for products and services, many businesses are allocating greater resources toward gathering customer input on products and services. These businesses are looking for feedback that can be used to develop new product features, improve the effectiveness of advertising, target new markets, and the like. One source for such feedback is the focus group—typically a group of eight to ten people under the direction of a moderator who solicits responses by asking questions. A car manufacturer, for example, might convene a group of ten car owners in order to talk with them about whether or not in-car Internet access would be a desirable new feature. The participants might meet in the conference room of a marketing research organization, and discuss the topics presented by the moderator for an hour. The participants are generally paid for their time, with compensation depending on the value of the participant. While consumers may receive up to $75.00 per session, executives or industry experts may command $150.00 or more for their time.

Although focus groups often provide a rich set of customer opinion, they also represent a considerable cost to most companies. Marketing research organizations conducting such sessions often charge fees ranging from thousands to tens of thousands of dollars, depending on the complexity and duration of the session. Such sessions can also present logistical challenges in getting appropriate participants in the same place at the same time, especially for focus groups requiring specialized participants. In some cases, participants may also require reimbursement of transportation costs—adding to the already burdensome costs. There are also costs associated with finding the participants, such as advertising expenditures in the local newspaper.

Some marketing research companies have attempted to mitigate such costs by conducting focus groups online. Greenfield Online of Westport, Conn., for example, has developed its own proprietary software, called FocusChat, which it uses to conduct focus group sessions over the Internet. The programs allow respondents to congregate in a virtual "room" and carry on a discussion under the guidance of a moderator. Clients, meanwhile, are able to observe the session and even send notes to the moderator, unnoticed by the group participants. Such online sessions reduce the need for physical facilities and eliminate transportation expenses, resulting in overall cost savings.

A major disadvantage of such focus groups, however, is the delayed nature of the payment to the participants. After completing a session, a user might have to wait a week or more for a check to arrive by mail, and then wait an additional few days for the check to clear. Such delays in payment tend to frustrate participants, and serve to discourage future focus group participation. Accordingly, what is needed is a system and method for conducting focus groups that is cost effective, efficient, and able to provide immediate compensation to participants.

In recent years, slot machines installed in United States casinos have generated greater than ten billion dollars of annual revenue. With individual machines typically earning between $50 and $150 per day, slot machines can account for the majority of a United States casino's overall profits. The net profit from slot machine play for a casino generally exceeds the profit from all other casino gaming activities.

The comparatively high profitability of slot machines may be attributed to many factors, such as the low operating cost of slot machines compared to table games, the ability of slot machines to conduct games at a faster play rate compared to table games, the appeal of slot machines to players of every skill level, and the large potential payout offered by slot machines in exchange for a comparatively small wager.

Since the profitability of slot machines is directly proportional to the amount of time that they are played, casinos often attempt to prolong the length of player gambling sessions. Casino slot clubs were developed with just such a goal in mind. Players were provided reward points for each dollar wagered, with points exchangeable for cash, merchandise, food, etc. Much like an airline frequent flyer mile system, slot clubs encouraged greater play since the player would earn larger reward point totals. Although these programs succeeded in providing an incentive to play more, players had no incentive to extend the length of a given gambling session since they could always pick up where they left off at a later session. Three sessions of one hour each were thus equivalent to one session of three hours. Every time that a player ended a gambling session, however, there was a risk that he would go to another casino. For this reason, casinos would prefer that a player play for extended periods of time rather than over multiple sessions.

One method that has been used to motivate increased play of slot machines is to generate bonus payouts dependent on cumulative effects of plays. For example, several reel slot machines manufactured by International Game Technology ("IGT") provide bonuses for the cumulative effects of spins. The game "Red. White and Blue Racing 7s" is representative of such games, featuring a race based on a number of reel symbols obtained within a given time period. The three colors of the reel symbol "7" appear on the reels with different frequencies. When a "7" comes up on a reel, a racing character "7" of the same color advances on an animated track. When a racing character crosses the finish line, the player receives a bonus, with higher bonuses for the symbol colors of lower frequency.

In another example of a cumulative bonus symbol type of game, AC Coin & Slot Service Company developed a series of games in which there was a time period during which a player attempted to accumulate a number of reel symbol outcomes. Three bonus payouts were provided at ten, fifteen and twenty-five coins, respectively. Each reel of the slot machine included one or more special symbols, the occurrence of which advanced the player closer to one of the three bonus levels. Upon the completion of a one-hundred second time period, the bonus session ended and the player result (i.e. the number of special reel symbols accumulated) was compared to the totals required to obtain each bonus level. Any bonus earned was paid out, and any accumulated special reel symbols were then zeroed out.

Slot machine racing games, such as the Red. White and Blue Racing 7s and bonus symbol games of AC Coin encourage an extended length gaming session in that the player does not want to end a session while he is still competing for the bonus payouts. However, the excitement and the motivation last only for the limited period of the race which cannot be extended indefinitely by the casino. When the race ends, all player investment in the racing aspects of the game are lost, and the player may be motivated to cease play and search for another game.

Accordingly, a need exists for a slot machine which provides the player with an incentive to stay with the machine for longer periods of time.

SUMMARY OF THE INVENTION

The present invention overcomes the above and other drawbacks of the prior art by providing a system whereby people may receive cash immediately in exchange for their participation in focus groups, without having to travel to a central location.

According to one embodiment of the present invention, a marketer transmits a topic of discussion to a slot server that is connected to one or more slot machines. The marketer may specify a target pool of focus group participants. The slot server then transmits the topic of discussion to selected players at the slot machines, limiting the pool of players to those who fall into the marketer's target pool. A moderator affiliated with the marketer or the slot server may then conduct the focus group among players who agree to participate. The moderator may use the slot server as a relay for communications with the focus group participants. Participants may comment verbally using microphones connected to their slot machines, or may key-in comments using a similarly connected keypad. Participant images may be transmitted to other members of the focus group via cameras mounted in the casino or connected to the slot machines themselves. Throughout the duration of the focus group, the moderator may pose questions to the group, give individual participants the opportunity to speak, add new participants to the group, drop old participants from the group, and provide instant financial incentives to individual participants via the slot machines' coin trays. At the end of the focus group, the moderator may signal that all participants be given compensation also via their slot machines' coin trays. The marketer may then compensate the operator of the slot server both for conducting the focus group and for the compensation provided to the focus group participants.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 7 is a table illustrating an example data structure of an example player database 310 as depicted in FIG. 2 for use in some embodiments of the present invention.

FIG. 8 is a table illustrating an example data structure of an example of focus group database 312 as depicted in FIG. 2 for use in some embodiments of the present invention.

FIG. 9 is a table illustrating an example data structure of an example marketer database 314 as depicted in FIG. 2 for use in some embodiments of the present invention.

FIG. 10 is a table illustrating an example data structure of an example current participant database 316 as depicted in FIG. 2 for use in some embodiments of the present invention.

DETAILED DESCRIPTION OF THE INVENTION

Figure 1A:
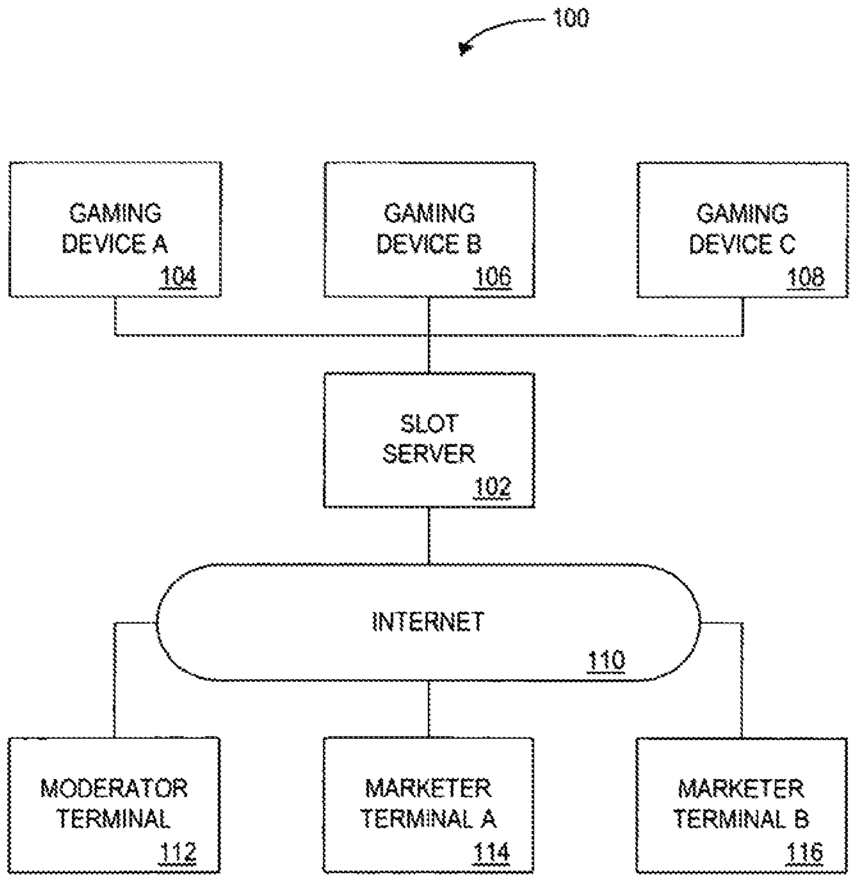
FIG. 1A is a block diagram illustrating an example system according to some embodiments of the present invention.

In the following description, reference is made to the accompanying drawings which form a part hereof, and in which is shown by way of illustration, specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Applicants have recognized that a need exists for systems and methods that help marketers and other researchers conduct focus groups efficiently and cost effectively. One benefit of embodiments of the present invention is that players already at gaming devices do not have to travel in order to participate in a focus group. Thus, there are no transportation costs related to conducting the focus group. Another benefit of embodiments of the present invention is that players at gaming devices may receive immediate, tangible compensation for their participation in focus groups. The compensation may be even more motivating to players than to others, as players might desire to recoup recent losses.

Yet another benefit of embodiments of the present invention is that the cameras already present in casinos may allow player's images to be transmitted to all the members of a focus group, creating a more authentic focus group experience.

Yet another benefit of embodiments of the present invention is that gaming devices such as slot machines are capable of gathering extensive information on players. This information may then be used to choose people with the desired characteristics and/or proper backgrounds for a particular focus group.

From the perspective of the casino, another benefit of embodiments of the present invention is that players participating in a focus group, may be motivated to remain at a gaming device and potentially gamble more that they would otherwise. As players earn more money from their participation in focus groups, it is likely that this money will be spent on playing the gaming machine, particularly because, in some embodiments, the compensation for the focus group participation is delivered the same way winnings are delivered. In other embodiments, the casino may be paid fees directly from the marketer.

A. DEFINITIONS

Throughout the description that follows and unless otherwise defined, the following terms will refer to the meanings provided in this section. These terms are provided to clarify the language selected to describe the embodiments of the invention both in the specification and in the appended claims.

The terms "product," "goods," "merchandise," and "services" shall be synonymous and refer to anything licensed, leased, sold, available for sale, available for lease, available for licensing, and/or offered or presented for sale, lease, or licensing including packages of products, subscriptions to products, contracts, information, services, and intangibles.

The term "casino" shall refer to the owner of gaming devices, their agents, and/or any entity who may profit from players' use of the gaming devices.

The term "comment" shall refer to any verbal, written, or other communication made by a participant in a focus group.

The term "frequent shopper card" shall refer to a device that may be capable of storing information about a shopper. This information may include identifying information and shopping history information. The frequent shopper card may be machine readable, for example, by a POS terminal.

The term "marketer" shall refer to an entity who may desire to conduct a focus group in order to gather opinions and/or information on some topic.

The term "marketer terminal" shall refer to a device that may be capable of receiving instructions from a marketer and of communicating instructions to a slot server. The instructions may indicate whom to invite into a focus group and what topics are to be discussed in the focus group.

The term "moderator" shall refer to an entity or program that leads and/or guides the discussion in a focus group. The moderator may, for example, pose questions to the focus group, grant permission for focus group participants to speak, and allocate compensation to be paid to focus group participants.

The term "moderator terminal" shall refer to an interface that may aid a moderator in conducting a focus group.

The term "pay line" shall refer to a dimension on a slot machine or gaming device along which particular symbols may line up in order for a player to qualify to receive a prize. A typical slot machine may have a single pay line running left to right across the center of a display screen. Additional pay lines may run left to right across the top of the screen, or may run up and down, diagonally, or along some irregular path.

The term "player tracking card" shall refer to a device that may be capable of storing information about a player. This information may include identifying information, as well as financial information, such as a number of credits remaining. The card may be machine readable, for example, by a gaming device.

The term "prize table" shall refer to a chart that may list winning symbol combinations together with the size or amount of the payouts (and/or prizes) to be paid if one or more of the listed symbol combinations occur while playing a gaming device.

The term "slot server" shall refer to a device that may be in communication with a marketer terminal, a moderator terminal, and/or a plurality of gaming devices, and may be capable of relaying communications to and from each.

The term "gaming device" shall refer to any gaming machine, including slot machines, video poker machines, video bingo machines, video keno machines, video blackjack machines, etc. that is capable of dispensing cash money and/or gambling tokens. Gaming devices may or may not be owned by a casino and/or may or may not exist within a casino.

The term "casino games" shall refer to gaming devices and any other gambling games offered at a casino including table games such as craps, black jack, poker, roulette, etc.

The term "compensation dispensing device" shall refer to any device capable of paying out tangible value including an automated teller machine (ATM), a point of sale (POS) terminal, a juke box, a kiosk, a telephone, a pay phone, a cell phone, an Internet appliance, a gasoline pump, atoll booth, a vending machine, a networked computer, an arcade game, an audio-video player, etc.

The term "tangible value" shall refer to items that are intrinsically valuable such as cash that may provide a sensation of instant gratification. Tangible value is distinct from "abstract value" such as an electronic funds transfer to a bank account. In other words, tangible value may be directly perceived with the five basic senses as opposed to only being intellectually comprehended. Coins dropping into a slot machine tray are tangible value while credits accumulating in a casino account are abstract value.

The term "input device" shall refer to a device that is used to receive an input. An input device may communicate with or be part of another device (e.g. a point of sale terminal, a point of display terminal, a customer device, a moderator terminal, a marketer terminal, a gaming device, a slot server, etc.). Some examples of input devices include: a bar-code scanner, a magnetic stripe reader, a computer keyboard, a point-of-sale terminal keypad, a touch-screen, a microphone, an infrared sensor, a sonic ranger, a computer port, a video camera, a digital camera, a GPS receiver, a radio frequency identification (RFID) receiver, a RF receiver, a thermometer, and a weight scale.

The term "output device" shall refer to a device that is used to output information. An output device may communicate with or be part of another device (e.g. a point of sale terminal, a point of display terminal, a customer device, a moderator terminal, a marketer terminal, a gaming device, a slot server, etc.). Possible output devices include: a cathode ray tube (CRT) monitor, liquid crystal display (LCD) screen, light emitting diode (LED) screen, a printer, an audio speaker, an infra-red transmitter, a radio transmitter.

The term "I/O device" shall refer to any combination of input and/or output devices.

B. SYSTEM

Referring now to FIG. 1A, a system 100 according to some embodiments of the present invention includes a slot server 102, operable by a casino or other entity, that is in one or two-way communication with one or more gaming devices 104, 106, 108, moderator terminals 112 and/or marketer terminals 114, 116.

Figure 1B:
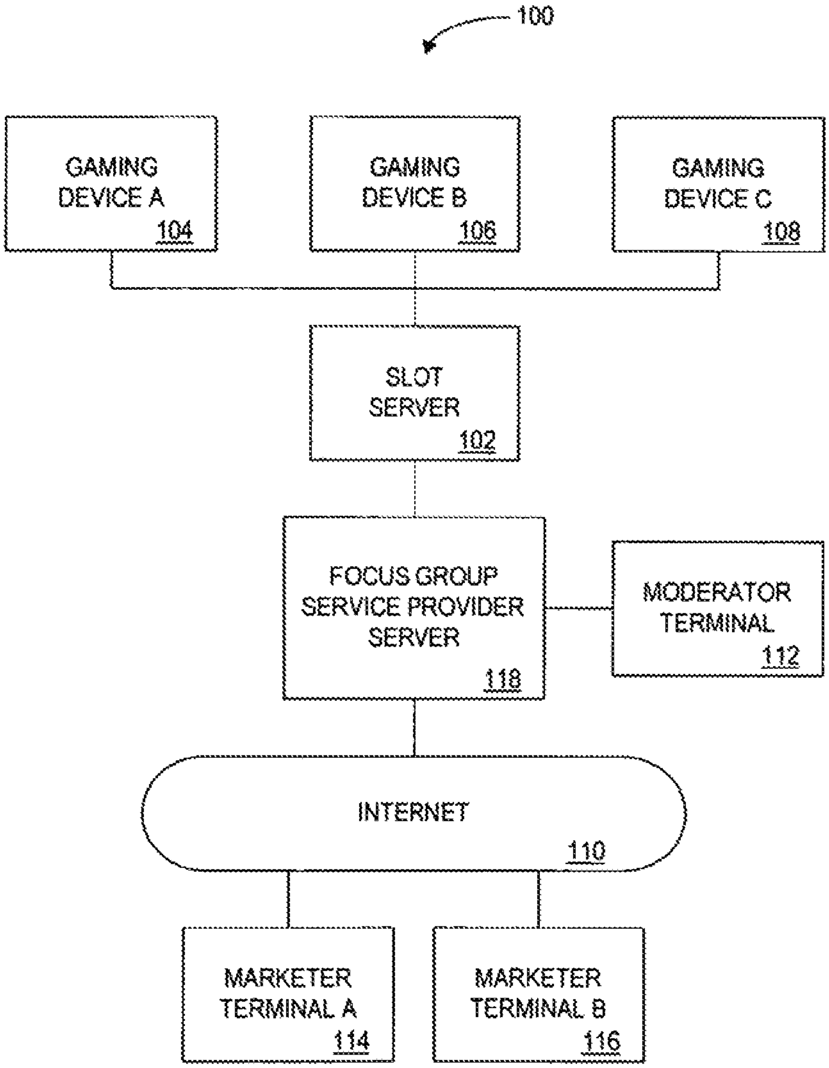
FIG. 1B is a block diagram illustrating an alternative example system according to some embodiments of the present invention.

Referring to FIG. 1B, an alternative system 100 according to some other embodiments of the present invention further includes one or more focus group service provider servers 118. The focus group service provider server 118 may also be in one or two-way communication with the slot server 102. However, in the embodiment depicted in FIG. 1B, the focus group service provider server 118 is positioned between the slot server 102 and both the moderator terminals 112 and/or marketer terminals 114, 116.

The primary difference between the two alternative embodiments depicted in FIGS. 1A and 1B is that the embodiment of FIG. 1B includes a focus group service provider server 118 which may be operable by an entity both distinct and physically remote from the casino. The embodiment of FIG. 1A consolidates the functions of the focus group service provider server 118 into the slot server 102 which may be operable by the casino.

An additional difference between these two embodiments relates to the physical topology of the system 100. In both of the embodiments, each node may securely communicate with every other node in the system 100 via, for example, a virtual private network (VPN). Thus, all nodes may be logically connected. However, the embodiment depicted in FIG. 1B allows the focus group service provider server 118 to serve as a single gateway between the nodes that will typically be operated by the casino (and the casino's customers) and the other nodes in the system 100, i.e. nodes that may be operated by entities other than the casino.

In both embodiments, communication between the slot server 102 and the marketer terminals 114, 116, the moderator terminals 112, the gaming devices 104, 106, 108, and/or the focus group service provider server 118, may be direct and/or via a network such as the Internet 110.

Referring to both FIGS. 1A and 1B, each of the slot server 102, the focus group service provider server 118, the marketer terminals 114, 116, the moderator terminals 112 and the gaming devices 104, 106, 108 may comprise computers, such as those based on the Intel® Pentium® processor, that are adapted to communicate with each other. Any number of focus group service provider servers 118, marketer terminals 114, 116, moderator terminals 112 and/or gaming devices 104, 106, 108 may be in communication with the slot server 102. In addition, the gaming devices 104, 106, 108 may be in one or two-way communication with the marketer terminals 114, 116 and the moderator terminals 112. The slot server 102, the focus group service provider server 118, the marketer terminals 114, 116, the moderator terminals 112 and the gaming devices 104, 106, 108 may each be physically proximate to each other or geographically remote from each other. The slot server 102, the focus group service provider server 118, the marketer terminals 114, 116, the moderator terminals 112 and the gaming devices 104, 106, 108 may each include input devices (not pictured) and output devices (not pictured).

As indicated above, communication between the slot server 102, the focus group service provider server 118, the marketer terminals 114, 116, the moderator terminals 112 and the gaming devices 104, 106, 108 may be direct or indirect, such as over an Internet Protocol (IP) network such as the Internet, an intranet, or an extranet through a web site maintained by the slot server 102 (and/or the focus group service provider server 118) on a remote server or over an on-line data network including commercial on-line service providers, bulletin board systems, routers, gateways, and the like. In yet other embodiments, the devices may communicate with the slot server 102 over local area networks including Ethernet, Token Ring, and the like, radio frequency communications, infrared communications, microwave communications, cable television systems, satellite links, Wide Area Networks (WAN), Asynchronous Transfer Mode (ATM) networks. Public Switched Telephone Network (PSTN), other wireless networks, and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The slot server 102 (and/or the focus group service provider server 118) may function as a "web server" that generates web pages which are documents stored on Internet-connected computers accessible via the World Wide Web using protocols such as, e.g., the hyper-text transfer protocol ("HTTP"). Such documents typically include a hyper-text markup language ("HTML") file, associated graphics, and script files. A web server allows communication with the slot server 102 in a manner known in the art. The marketer terminals 114, 116, the moderator terminals 112 and the gaming devices 104, 106, 108 may use a web browser, such as NAVIGATOR® published by NETSCAPE® for accessing HTML forms generated or maintained by or on behalf of the slot server 102 and/or the focus group service provider server 118.

As indicated above, any or all of the slot server 102, the focus group service provider server 118, the marketer terminals 114, 116, the moderator terminals 112 and the gaming devices 104, 106, 108 may include, e.g., processor based cash registers, telephones, interactive voice response (IVR) systems such as the ML400-IVR designed by MISSING LINK INTERACTIVE VOICE RESPONSE SYSTEMS, cellular phones, vending machines, pagers, personal computers, portable types of computers, such as a laptop computer, a wearable computer, a palm-top computer, a hand-held computer, and/or a Personal Digital Assistant ("PDA"). Further details of the slot server 102, the focus group service provider server 118, the marketer terminals 114, 116, the moderator terminals 112 and the gaming devices 104, 106, 108 are provided below with respect to FIGS. 2 through 6.

In some embodiments of the invention the slot server 102 (and/or the focus group service provider server 118) may include marketer terminals 114, 116, and/or moderator terminals 112. Further, the slot server 102 may communicate with marketers directly instead of through the marketer terminals 114, 116, and/or the moderator terminals 112. Although not pictured, the slot server 102, the focus group service provider server 118, the marketer terminals 114, 116, the moderator terminals 112 and the gaming devices 104, 106, 108 may also be in communication with one or more player/participant credit institutions to effect transactions and may do so directly or via a secure financial network such as the Fedwire network maintained by the United States Federal Reserve System, the Automated Clearing House (hereinafter "ACH") Network, the Clearing House Interbank Payments System (hereinafter "CHIPS"), or the like.

In operation, the marketer terminals 114, 116, the moderator terminals 112 and/or the gaming devices 104, 106, 108 may exchange information about the focus group topic via the slot server 102. In embodiments with a focus group service provider server 118, the marketer terminals 114, 116, the moderator terminals 112 and/or the gaming devices 104, 106, 108 may exchange information about the focus group topic via the focus group service provider server 118. The moderator terminals 112 may provide questions, issues, images, or other information to the gaming devices 104, 106, 108 based upon requirements received from the marketer terminals 114, 116.

C. DEVICES

Figure 2:
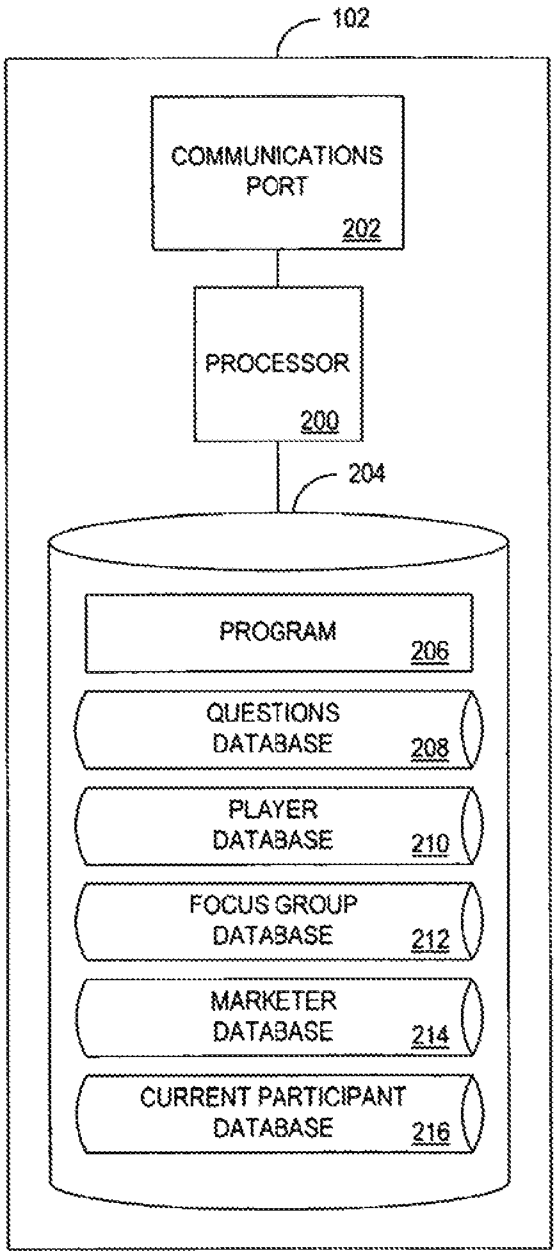
FIG. 2 is a block diagram illustrating an example of a slot server 102 as depicted in FIG. 1A according to some embodiments of the present invention.

FIG. 2 is a block diagram illustrating details of an example of the slot server 102 of FIG. 1A. The slot server 102 is operative to manage the system and execute the methods of the present invention. The slot server 102 may be implemented as one or more system controllers, one or more dedicated hardware circuits; one or more appropriately programmed general purpose computers, or any other similar electronic, mechanical, electro-mechanical, and/or human operated device. For example, in FIG. 1B, the slot server 102 is depicted as coupled to a focus group service provider server 118. In the embodiment of FIG. 1B, these two servers provide the same functions as the slot server 102 alone in the embodiment of FIG. 1A.

The slot server 102 (and/or the focus group service provider server 118) may include a processor 200, such as one or more Intel® Pentium® processors. The processor 200 may include or be coupled to one or more clocks or timers (not pictured), which may be useful for determining information relating to, for example, measurement of focus group participant response time and frequency, and one or more communication ports 202 through which the processor 200 communicates with other devices such as the marketer terminals 114, 116, the moderator terminals 112, the gaming devices 104, 106, 108 and/or the focus group service provider server 118. The processor 200 is also in communication with a data storage device 204. The data storage device 204 includes an appropriate combination of magnetic, optical and/or semiconductor memory, and may include, for example, additional processors, communication ports; Random Access Memory ("RAM"), Read-Only Memory ("ROM"), a compact disc and/or a hard disk. The processor 200 and the storage device 204 may each be, for example: (i) located entirely within a single computer or other computing device; or (ii) connected to each other by a remote communication medium, such as a serial port cable, telephone line, radio frequency transceiver, or the like. In some embodiments for example, the slot server 102 may comprise one or more computers (or processors 200) that are connected to a remote server computer operative to maintain databases, where the data storage device 204 is comprised of the combination of the remote server computer and the associated databases.

The data storage device 204 stores a program 206 for controlling the processor 200. The processor 200 performs instructions of the program 206, and thereby operates in accordance with the present invention, and particularly in accordance with the methods described in detail herein. The present invention can be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 206 may be stored in a compressed, uncompiled and/or encrypted format. The program 206 furthermore may include program elements that may be generally useful, such as an operating system, a database management system and "device drivers" for allowing the processor 200 to interface with computer peripheral devices. Appropriate general purpose program elements are known to those skilled in the art, and need not be described in detail herein.

Further, the program 206 is operative to execute a number of invention-specific modules or subroutines including but not limited to one or more routines to identify a gaming device 104, 106, 108 player as a potential focus group participant; one or more routines to facilitate and control communications between participants, moderators, and marketers; one or more routines to verify a participants participation; one or more routines to compensate participants; and one or more routines to control databases or software objects that track participants, marketers, casinos, focus groups, questions, compensation, participation, gambling, and moderators. Examples of these routines are described in detail below in conjunction with the flowchart depicted in FIG. 11.

According to some embodiments of the present invention, the instructions of the program 206 may be read into a main memory of the processor 200 from another computer-readable medium, such from a ROM to a RAM. Execution of sequences of the instructions in the program 206 causes processor 200 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 206, the storage device 204 is also operative to store (i) a questions database 208, (ii) a player database 210, (iii) a focus group database 212, (iv) a marketer database 214, and (v) a current participant database 216. The databases 208, 210, 212, 214, 216 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though five separate databases are illustrated, the invention could be practiced effectively using one, two, three, four, six, or more functionally equivalent databases. Similarly, the illustrated entries of the databases represent exemplary information only; those skilled in the art will understand that the number and content of the entries can be different from those illustrated herein. Further, despite the depiction of the databases as tables, an object based model could be used to store and manipulate the data types of the present invention and likewise, object methods or behaviors can be used to implement the processes of the present invention. These processes are described below in detail with respect to FIG. 11.

Figure 3:
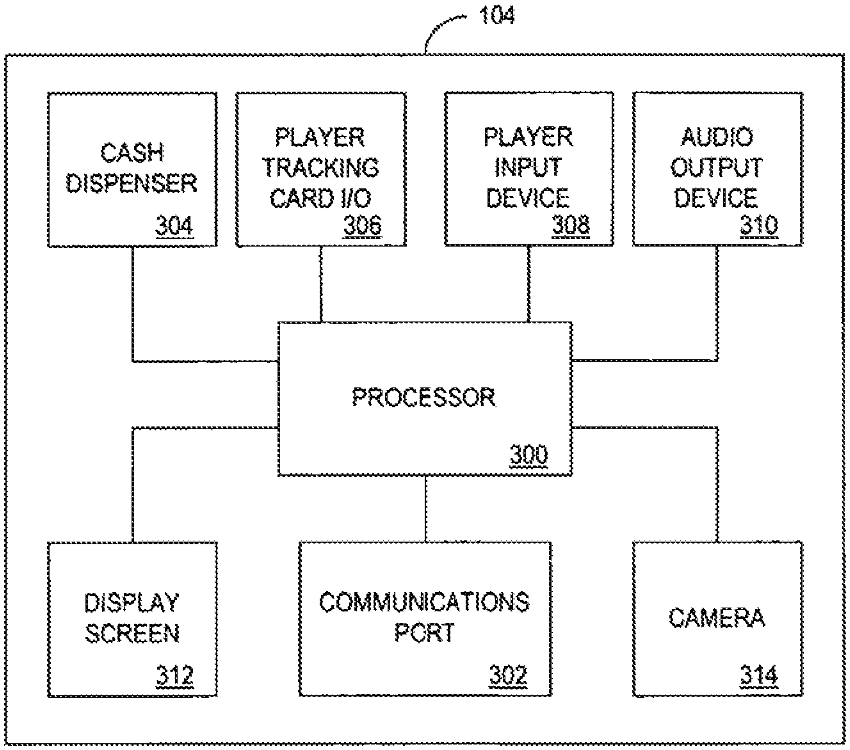
FIG. 3 is a block diagram illustrating an example of a gaming device 104 as depicted in FIG. 1 according to some embodiments of the present invention.

Turning to FIG. 3, a block diagram of an example gaming device 104 is depicted. A gaming device 104 according to the present invention may include a processor 300 coupled to a communications port 302, a cash dispenser 304, a player tracking card I/O device 306, a player input device 308, audio output device 310, display screen 312, and a camera 314. In addition, a gaming device 104 may include a system for generating and/or selling outcomes certified by a gaming authority. Such systems include slot machines which include conventional reel slot machines, video slot machines, video poker machines, video keno machines, video blackjack machines, and other gaming machines. Further, many alternative input and output devices may be used in place of the various devices pictured in FIG. 3. Uses of these gaming device 104 components are discussed below in conjunction with the description of the methods of the present invention.

Figure 4:
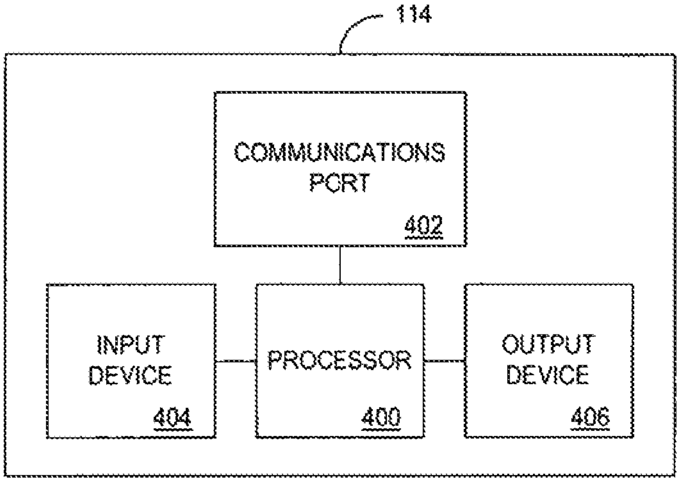
FIG. 4 is a block diagram illustrating an example of a marketer terminal 114 as depicted in FIG. 1 according to some embodiments of the present invention.

Turning to FIG. 4, a block diagram of an example marketer terminal 114 is depicted. A marketer terminal 114 according to the present invention may include a processor 400 coupled to a communications port 402, an input device 404, and an output device 406. As indicated in FIG. 4, a marketer terminal 114 may be implemented by any number of devices such as a processor based cash register, a telephone, an IVR system, a cellular phone, a vending machine, a pager, a personal computer, a portable computer such as a laptop, a wearable computer, a palm-top computer, a hand-held computer, and/or a PDA.

Figure 5:
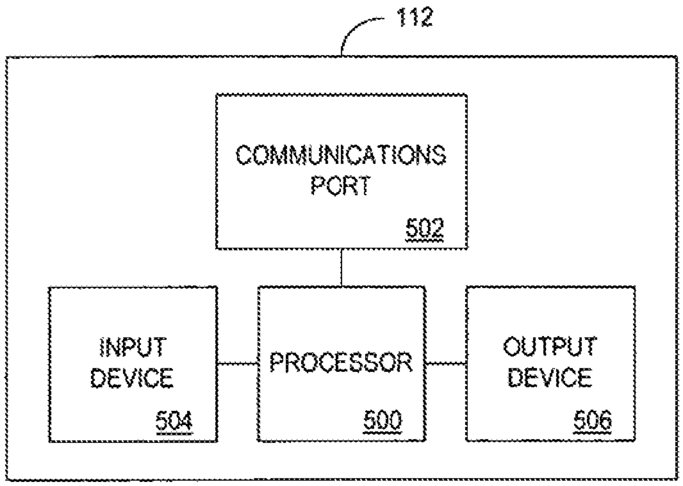
FIG. 5 is a block diagram illustrating an example of a moderator terminal 112 as depicted in FIG. 1 according to some embodiments of the present invention.

Turning to FIG. 5, a block diagram of an example moderator terminal 116 is depicted. A moderator terminal 116 according to the present invention may include a processor 500 coupled to a communications port 502, an input device 504, and an output device 506. A moderator terminal 116 may also include a user interface to aid a moderator in conducting a focus group according to the present invention. An example of a user interface that may be implemented on a moderator terminal 116 is described below with respect to FIG. 6. As indicated in FIG. 5, a moderator terminal 116 may be implemented by any number of devices such as a processor based cash register, a telephone, an IVR system, a cellular phone, a vending machine, a pager, a personal computer, a portable computer such as a laptop, a wearable computer, a palm-top computer, a hand-held computer, and/or a PDA.

Figure 6:
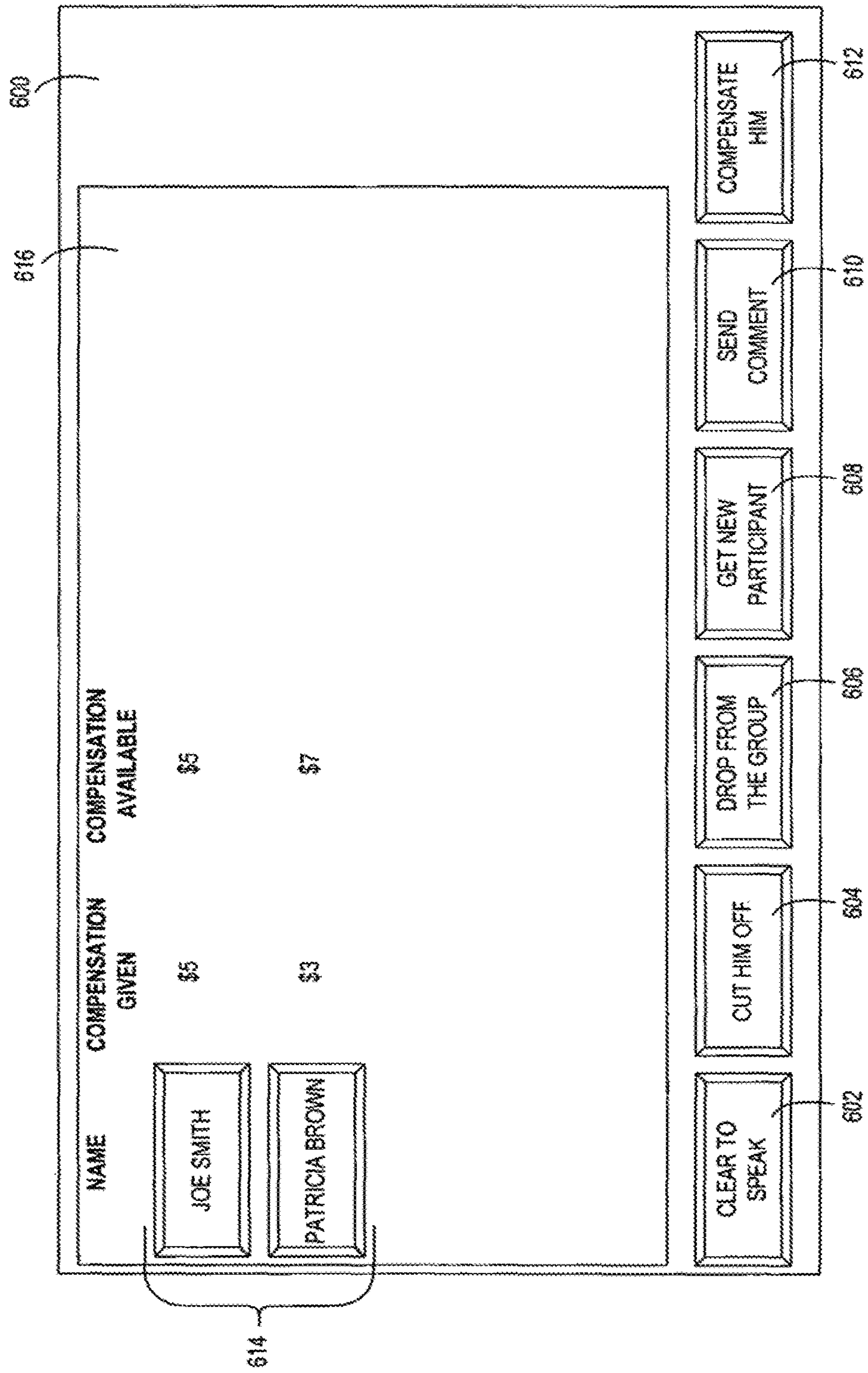
FIG. 6 is a block diagram illustrating an example of a moderator graphical user interface that can be used on moderator terminal 112 according to some embodiments of the present invention.

Turning to FIG. 6, an example of a graphical user interface (GUI) 600 for a moderator terminal 116 is depicted. Visual Information helpful for a moderator conducting a focus group according to the present invention may include, for example, several GUI controls 602, 604, 606, 608, 610, 612; participant buttons 614; and a compensation status chart 616. It should be understood that the particular GUI 600 depicted in FIG. 6 is an example of one possible embodiment of a GUI and that many other alternative designs may be used.

The GUI controls may include, for example, a "Clear to Speak" button 602, a "Cut Him Off" button 604, a "Drop from the Group" button 606, a "Get New Participant" button 608, a "Send Comment" button 610, and a "Compensate Him" button 612. The participant buttons 614 may each represent the individual participants in a current focus group. In FIG. 6, the two participants shown are "JOE SMITH" and "PATRICIA BROWN." In alternative embodiments the participant buttons 614 may display an alternative identifier such as, for example, a location name, an identification number, an alias, an avatar icon, and/or a color code.

The compensation status chart 616 may include graphics or text that indicates to a moderator information relevant to compensating participants or otherwise controlling the focus group. In the example compensation status chart 616 depicted in FIG. 6, two information items are displayed for each participant: "COMPENSATION GIVEN" and "COMPENSATION AVAILABLE." This same information may be represented using a pie, bar, and/or other graphs. Other graphics may also be used to help more clearly convey the information to the moderator. In addition, other information items may be displayed on a compensation status chart 616. For example, participant status indicating, for example, the player's gambling rate, response rate, heart rate, level of participation, gambling performance, etc. Note that such information items may not necessarily relate to the participant's compensation status. These items may, for example, merely help the moderator understand and/or control the participants in the focus group. Many other types of information items may be represented in the compensation status chart 616 and in the GUI 600.

D. DATABASES

As indicated above, it should be noted that a though the example embodiment of FIG. 2 is illustrated to include five particular databases stored in storage device 204, other database arrangements may be used which would still be in keeping with the spirit and scope of the present invention. In other words, the present invention could be implemented using any number of different database files or data structures, as opposed to the five depicted in FIG. 2. Further the individual database files could be stored on different servers (e.g. located on different storage devices in different geographic locations, such as on a focus group service provider server 118). Likewise, the program 206 could also be located remotely from the storage device 204 and/or on another server. As indicated above, the program 206 includes instructions for retrieving, manipulating, and storing data in the databases 208, 210, 212, 214, 216 as necessary to perform the methods of the invention as described below.

1. Questions Database

Although an example table illustrating a questions database 208 according to the present invention is not provided, such a database may be useful in practicing the present invention. In its simplest form, a questions database 208 may be a list of discussion topics and/or questions that the focus group moderator may wish to present to participants. For example, questions such as "When you look at this package, what do you think of?"; "How much would you pay for a product that could remove any stain?"; and "How often do you shop on the Internet?" may be stored in such a questions database 206. In more automated embodiments of the present invention, a questions database 208 may include question and answer tracking information. For example, each question would have a question identifier associated with it and possibly an associated category and/or question type identifier. Further, such a database may be designed to help a moderator to develop and refine questions. A questions database 208 in conjunction with a current participant database 216 may be used to determine the effectiveness of questions. Based upon participant's comments, the questions may be altered and new questions may be added.

2. Player Database

Turning to FIG. 7, a tabular representation of an embodiment of a player database 210 according to some embodiments of the present invention is illustrated. This particular tabular representation of a player database 210 includes sample records or entries which each include information regarding a particular player. In some embodiments of the invention, player database 210 is used to track such things as player information regarding accounts and demographics, gaming devices played, gambling performance, and participation in prior focus groups. Those skilled in the art will understand that such player database 210 may include any number of entries.

The particular tabular representation of a player database 210 depicted in FIG. 7 defines a number of fields for each of the entries or records. The fields may include: (i) a player identifier field 700 that stores a representation uniquely identifying the player; (ii) a name field 702 that stores a representation of the player's name; (iii) a financial account identifier field 704 that stores a representation of the player's credit card number or other financial account; (iv) a demographic field 706 that stores a representation of information about demographic characteristics of the player; (v) a machine identifier field 708 that stores a representation identifying the gaming device the player is using; (vi) a rate of play field 710 that stores a representation of a number of gaming device plays (i.e. handle pulls) per unit time that the player is averaging; (vii) a duration of play field 712 that stores a representation of the amount of time the player has been playing; (viii) a projected theoretical win field 714 that stores a representation of the amount of money the casino expects to win from the player based upon the player's rate of play and the corresponding coin-in amount; (ix) a historical theoretical win field 716 that stores a representation of the average amount the casino is expected to win from the player when he visits, computed based upon gambling performance during prior visits and/or sessions; (x) a casino actual win/loss field 718 that stores a representation of the amount the casino has won from (or lost to) the player during the current gaming session; and (xi) a prior focus group field 720 that stores a representation of the focus groups in which the player has previously participated or is currently participating.

The example player database 210 depicted in FIG. 7 provides example data to illustrate the meaning of the information stored in this database embodiment. A player identifier 700 (e.g. 111123P, 222234P) may be used to identify and index the players listed in the player database 210. The listed players are named "SAM BROWN" and "LINDA JONES." Sam Brown's bank account number is "1111-1111-1111-1111" and he is a twenty-three year old male. Linda Jones' credit card number is "2222-2222-2222-2222" and she is a forty-seven year old female. Sam is playing at gaming device number 234M, which may, for example, be a slot machine in Las Vegas. Linda is playing at gaming device number 532M, which may be a video poker machine in Atlantic City. Note that an additional database (not pictured) that may be used may store information regarding the gaming devices. According to the rate and duration of play fields 710,712 Sam is averaging six pulls per minute on his slot machine and has been playing for an hour and five minutes. Linda is averaging ten bets per minute on her video poker machine and has been playing for two hours and fifty-eight minutes. Before they are finished playing, the casino expects to win $58 from Sam and $63 from Linda, according to the projected theoretical win field 714. This amount may be computed based upon the hold percentage of the machine and the rate of coin-in during the session up to that point. Based on prior gambling sessions and as reflected in the historical theoretical win field 716, the casino has determined that it can expect to win $252 from Sam and win $105 from Linda. According to the casino actual win/loss field 718, up until the current point in time reflected in the example player database 210, the casino has won $26 from Sam and $44 from Linda. According to the prior focus group field 720. Sam has participated in one other focus group and Linda is currently participating in her first one.

The player database 210 may be particularly useful for storing and retrieving information by a moderator (or marketer) during a focus group in order to make decisions about how to control the focus group. Further, many of the fields discussed above may provide useful information that may be displayed on the GUI 600 of a moderator terminal 112. This would allow a moderator to more easily identify more or less desirable participants. For example, if a moderator desired to maximize the casino's profits from the focus group participants, he might decide to drop Linda from the focus group based upon her lower projected theoretical win. In such a case, the moderator might choose to replace Linda with a player who has a larger projected theoretical win.

3. Focus Group Database

Turning to FIG. 8, a tabular representation of an embodiment of focus group database 212 according to some embodiments of the present invention is illustrated. This particular tabular representation of a customer intended usage database 212 includes three sample records or entries which each include information regarding a particular focus group. In some embodiments of the invention, a focus group database 212 is used to track such things as focus group date, who the moderator and marketer were, the topics discussed, the focus group pool definition, information about the compensation, and the price of the focus group to the marketer. Those skilled in the art will understand that such a focus group database 212 may include any number of entries.

The particular tabular representation of a focus group database 212 depicted in FIG. 8 defines a number of fields for each of the entries or records. The fields may include: (i) a group identifier field 800 that stores a representation uniquely identifying a particular focus group; (ii) a date/time field 802 that stores a representation identifying when the focus group started; (iii) a marketer field 804 that stores a representation of a marketer that has commissioned the focus group; (iv) a moderator field 806 that stores a representation of the person who has moderated the focus group; (v) a topic field 808 that stores a representation of a description of what will be discussed in the focus group; (vi) a focus group pool definition field 810 that stores a representation of the characteristics of the desired participants; (vii) a focus group duration field 812 that stores a representation of the length of time the focus group will run; (viii) a deliverable field 814 that stores a representation of the type and/or form of information the marketer will receive; (ix) a compensation to each participant field 816 that stores a representation of the base amount of a payment participants receive for participating in the focus group; (x) a maximum discretionary payment field 818 that stores an amount that a moderator may provide to a participant based upon the participant's comments and value to the marketer; (xi) a rules for awarding compensation field 820 that stores a representation of rules that define how the moderator compensates the participants; (xii) a price of focus group field 822 that stores a representation of the amount the marketer has been (and/or will be) charged for the moderator to conduct the focus group; and (xiii) a "has marketer paid?" field 824 that stores a representation of whether payment for the focus group has been received from the marketer.

The example focus group database 212 of FIG. 8 provides example data to illustrate the meaning of the information stored in this database embodiment. A focus group identifier 800 (i.e. 1000F, 1001F, 4563F) may be used to identify and index the focus groups that have taken place or are planned. Two of the three focus groups considered in the example data of FIG. 8 will occur (or have occurred) and the date of the third has not yet been determined. The three focus groups listed were commissioned by the marketers specified in the marketer field 804. As will be discussed below, the marketer database depicted in FIG. 9 provides information about the marketers. The moderator for each focus group (i.e. Samuel Johnson, Tracy Jones, and Jack Lopez) may be specified in the moderator field 806. An additional database, not pictured, that lists the moderators and information about them may be useful in some embodiments of the present invention. In some embodiments, the focus group may not be moderated, moderated by the system, moderated by one or more participants, and/or moderated by the marketer. In this example, the focus group topics include "Genetically Modified Foods," "Motorized Strollers" and "Wetland Development." In some embodiments, the topics may be pointers into a topics database, not pictured, or the questions database 208 discussed above. The focus group pool definition field 810 may be used to identify the characteristics (i.e. "50 people, Aged 21-35"; "25 people, Female. Only child, Aged 35-45"; "10 people at a time, 50 people total. Aged 30-50") of the pool of participants in the focus group. Note that the definition may also include instructions regarding how the group is conducted (i.e. "10 people at a time"). A duration (i.e. 60, 35, 20 minutes) of the focus group may be specified in the focus group duration field 812.

There are many possible alternative deliverables that a marketer may choose to receive as an output or result of a focus group. For example, these deliverables may include a transcript of the focus group, a video recording of each of the participants, and/or a summary of the group's opinion on issues related to the topic. The type of deliverable desired by the marketer may be specified in the deliverable field 814. The amount of compensation a participant may receive for his involvement in the focus group may be dynamically variable and different than other participants. Depending upon many different considerations, the participant may receive a base amount for agreeing to participate and then a certain amount based upon the comments he makes. For example, the first example focus group listed pays $20 for agreeing to participate and then $2 for each comment made up to a maximum of $100. Thus, a participant in this group may earn $120 if he makes fifty comments in the focus group ($20+(50 comments×$2/comment) $120).

The moderator may choose to disclose the compensation structure or it may be kept secret. Considerations that may effect the compensation structure include the desired level of participation, the amount of information hoped to be gained from the focus group, the gambling performance of the participants as reflected, for example, in the player database 210, the desired duration of the focus group, the economic status of the participants, and various other factors. The compensation structure may be designed to maximize a participant's time at a gambling device 104 by slowly paying out compensation. Alternatively, the compensation structure may be designed to minimize the impact of participating in the focus group on the participant's play rate of the gaming device. This may be done, for example, by not compensating a participant for comments if his rate of play drops below a certain threshold.

Finally, accounting information such as the price of the focus group (i.e. $3000, $2000, $1500) and whether the marketer has paid may also be stored in a focus group database 212 according to the present invention. Note that the price of a focus group may be variable. The price may be a function of many different costs including, for example, the compensation paid to the participants, the type of deliverable desired, and/or even the gambling performance of the participants (e.g. a discount may be given to a marketer if the casino realizes a large actual win). In some embodiments, the price may be completely independent of cost considerations.

4. Marketer Database

Turning to FIG. 9, a tabular representation of an embodiment of a marketer database 214 according to some embodiments of the present invention is illustrated. This particular tabular representation of a marketer database 214 includes two sample records or entries which each include information regarding a particular marketer. In some embodiments of the invention, a marketer database 214 is used to track information about the marketer including financial account information. Those skilled in the art will understand that such a marketer database 214 may include any number of entries.

The particular tabular representation of a marketer database 214 depicted in FIG. 9 defines a number of fields for each of the entries or records. The fields may include: (i) a marketer identifier field 900 that stores a representation uniquely identifying a marketer; (ii) a name field 902 that stores a representation of the name or description of the marketer corresponding to the marketer identifier; and (iii) a financial account identifier field 904 that stores a representation of a bank or other financial account number for charging the marketer for the focus groups.

The example marketer database 214 of FIG. 9 provides example data to illustrate the meaning of the information stored in this database embodiment. A marketer identifier 900 (e.g. 251M, 693M) may be used to identify and index the different marketers listed in the marketer database 214. The records may include a name (e.g. Biobranchex; Strollomotor) that helps describe and identify the particular marketer. Finally, as indicated above, a financial account (represented by an account number, e.g. 3333-3333-3333-3333; 4444-4444-4444-4444) may be specified to facilitate billing or actually charging marketers for services rendered, i.e. the conducting of focus groups.

5. Current Participant Database

Turning to FIG. 10, a tabular representation of an embodiment of a current participant database 216 according to some embodiments of the present invention is illustrated. This particular tabular representation of a current participant database 216 includes three sample records or entries which each include information regarding a particular comment submitted by a participant. In some embodiments of the invention, a current participant database 216 is used to track such things as which participant commented when and in response to what stimulus. Those skilled in the art will understand that a current participant database 216 may include any number of entries.

The particular tabular representation of current participant database 216 depicted in FIG. 10 defines a number of fields for each of the entries or records. The fields may include: (i) a comment identifier field 1000 that stores a representation uniquely identifying at least one participant comment; (ii) a player identifier field 1002 that stores a representation identifying at least one participant; (iii) a group identifier field 1004 that stores a representation identifying at least one focus group; (iv) a time field 1006 that stores a representation of a time the comment was made; (v) a stimulus field 1008 that stores a representation indicating to what the comment was made in response; and (vi) a comments field 1010 that stores a representation of the comment itself.

The current participant database 216 is thus operable to store a record describing each comment that the system of the present invention captures from the participants. These records may allow the moderator (or marketer) to correlate the participants' comments to each other to determine for example, the flow of the focus group discussion. Thus, for example, the time field 1006 may allow the moderator to reconstruct the sequence of comments that led the group to a certain conclusion.

The example current participant database 216 of FIG. 10 provides example data to illustrate the meaning of the information stored in this database embodiment. Each of the relevant details about each comment may be associated with a comment identifier 1000: a player identifier (e.g. 123456P) indicates which participant made the comment, a group identifier (e.g. 5555F) indicates which focus group the participant was in when the comment was made, a time (e.g. 4:09 PM) indicates when the comment was made, a stimulus (e.g. moderator question number 87921Q, comment number 454750, or none) indicates what the comment was in reaction to, if anything, and the comment itself (e.g. "I would be scared that the motor might hurt the baby . . . . Would the motor be quiet enough to let the baby sleep?"; "I agree"; "I'm all for genetically engineered foods. We need to maximize our food production to feed the growing population of the world.").

In operation, the capture and translation of participant comments into a current participant database 216 may be performed using voice recognition systems and artificial intelligence as is known in the art. Alternatively, participants and/or moderators may enter comments directly onto the system of the present invention via a text based input device or by selecting one or more predefined comments from a menu via other I/O devices. In addition, the moderator may insert information into the record of the focus group discussion to mark or tag interesting or valuable comments made by the participants.

E. PROCESS DESCRIPTIONS

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the invention's methods. The system described above is an example of a system that would be useful in practicing the invention's methods. For example, the player database 210 described above is useful for tracking players and information about them, but it is not absolutely necessary to have such a database in order to perform the methods of the invention. In other words, the methods described below may be practiced using a conventional player tracking system in conjunction with a gaming device transaction log.

Figure 11:
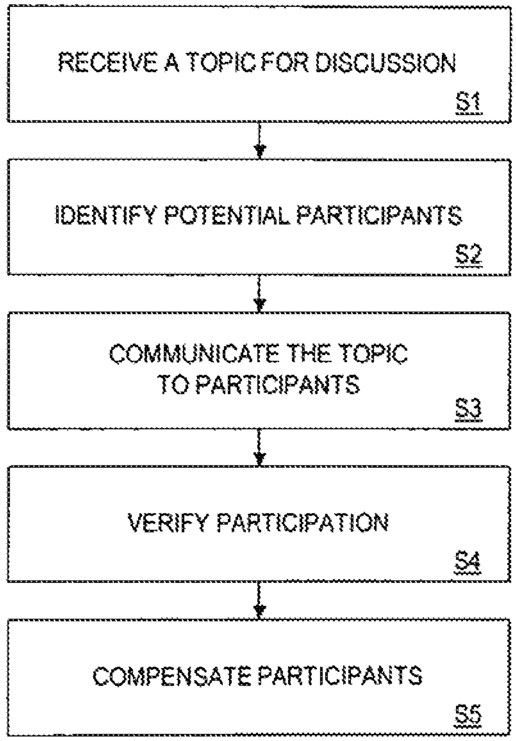
FIG. 11 is a flow diagram illustrating an exemplary process for conducting a focus group at a gaming device according to and for use in some embodiments of the present invention.

Referring to FIG. 11, a flow chart is depicted that represents some embodiments of the present invention that may be performed by the slot server 102 (FIGS. 1A and 1B), an external third party, and/or an integrated third party entity/device such as a focus group service provider server 118. It must be understood that the particular arrangement of elements in the flow chart of FIG. 11, as well as the order of example steps of various methods discussed herein, is not meant to imply a fixed order, sequence, and/or timing to the steps; embodiments of the present invention can be practiced in any order, sequence, and/or timing that is practicable.

In general terms and referring to FIG. 11, the method steps of the present invention may be summarized as follows. Although not necessary in some embodiments, the method of the present invention may be practiced using a database of player information. Alternatively, the player information may be received in a preliminary step. In Step S1, a topic for discussion by the focus group is received from a marketer. The topic may include specific questions. In Step S2, the system is used to identify players currently at gaming devices 104 who also are suitable potential participants in the focus group. Those players that accept an invitation to participate, become participants. In Step S3, the topic is communicated to the participants and the participants comments are relayed back. In Step S4, the moderator (and/or the system) verifies that each of the participants is in fact participating in the focus group. Finally, upon determining that the participants are actually participating, in Step S5 the moderator (and/or the system) provides compensation to the participants via the gaming device.

Figure 12:
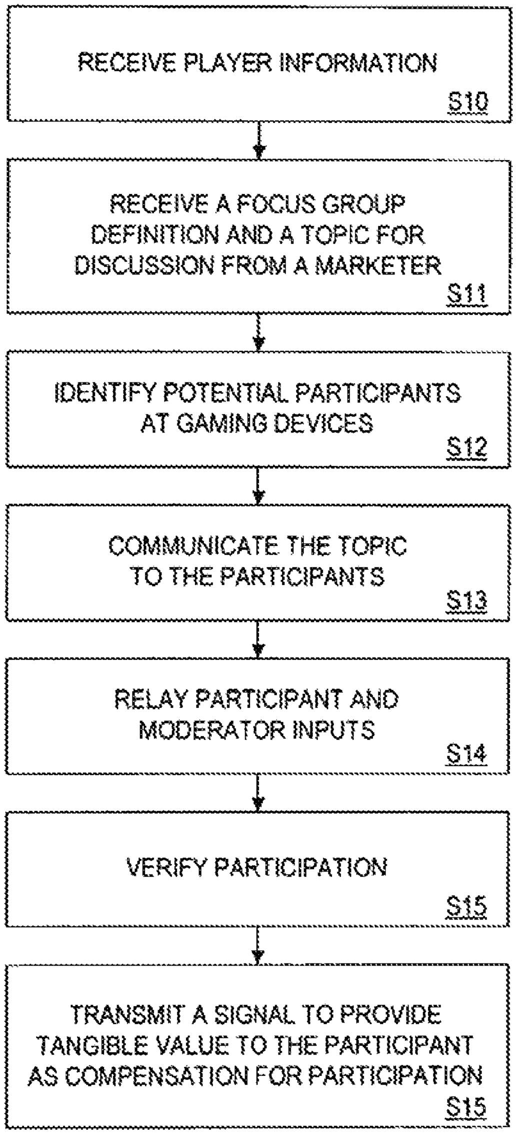
FIG. 12 is a flow diagram illustrating in detail an exemplary process for conducting a focus group at a gaming device according to and for use in some embodiments of the present invention.

In the subsections that follow, each of these five steps will now be discussed in greater detail. Note that additional and/or alternative steps are also discussed. Also note that the above five general steps represent elements of only some of the embodiments of the present invention and that they may be combined and/or subdivided in any number of different ways so that the method includes more or less actual steps. In other words, the methods of the present invention may contain any number of steps that are practicable to implement the processes described herein. Referring now to FIG. 12, the methods of the present invention are discussed in detail.

1. Receive Player Information

In Step S10, player information is received by the system of the invention. Player information may be used to identify a player as a desirable candidate for a focus group. Player information may include, for example, a name, a mailing address, an email address, a phone number, demographic information, product preferences, purchasing history, gambling performance, and so on. Player information may be received via a player tracking card inserted into a gaming device 104 player tracking card I/O 306 reader. Player information may be stored in a database record, e.g. the player database 210, so that when a player provides identifying information, other information may be obtained from the player's record. A player may also provide information through a survey. Alternatively, player information may be provided by a third party, such as a casino employee or a marketer, who has observed the player. Player information may be recorded by a gaming device, such information including the player's wager amounts, cumulative losses, and so on. Player information may be inferred and/or deduced. For example, a player operating a slot machine that is located in Las Vegas may be assumed to also be currently in Las Vegas. In some embodiments, the only player information received may be the fact that a player is currently at a gaming device.

2. Receive a Focus Group Definition and a Topic for Discussion from a Marketer

In Step S11, a focus group definition and a topic for discussion are received from a marketer. A marketer may communicate with the slot server 102 (and/or a focus group service provider server 118) via a marketer terminal 114 in communication with the slot server 102 (and/or a focus group service provider server 118). A marketer may define a desired set of characteristics for the focus group participants. Such characteristics may be defined broadly or narrowly, and may include age, demographic, place of birth, the name or other unique identifier of a particular player, purchasing history, and/or any other information that may be associated with a player. The focus group definition may be stored in a focus group database 212 as indicated above. The marketer may also specify a desired number of participants. The definition may specify a specific number or a range of satisfactory numbers of participants. The marketer may specify a set of numbers, each number corresponding to the desired number of participants with particular characteristics. Furthermore, the marketer may specify the number of players to whom an offer to participate in a focus group may be extended, the number of participants who are permitted to actually participate, and/or the number of participants who actually do participate. In some embodiments, the marketer may select from pre-defined focus group definitions rather than explicitly defining the characteristics of the group.

The marketer also submits one or more topics for discussion by the focus group. Alternatively, the marketer may submit an indication of a topic that is already stored within the slot server or with a gaming device. The marketer may submit a topic for discussion as text, audio, visual, or other information. For example, if the topic of discussion is a new pop ballad, the topic might be submitted as an audio file, together with a text introduction such as, "Here is a song we would like to discuss." If the topic of discussion is the packaging for a new detergent, then the topic might be submitted as a picture of the package. In some embodiments, the topic of discussion may continually change as the focus group participants interact both amongst themselves and with the moderator. There may or may not be an initially defined topic.

The marketer may submit an offer of compensation to the slot server in return for conducting the focus group. The offer may be to compensate the slot server on a per participant basis, on a per focus group basis, on the basis of the length of the focus group, or according to the value of the input received from the focus group. Furthermore, the offer may be divided into how much the slot server will be compensated, and how much the participants will be compensated. The marketer may also offer discretionary compensation, which may be dispensed to participants at the discretion of the moderator. The focus group database 212 of FIG. 8 may be used to store a description of how and when compensation is provided to the participants and the price/cost to marketer.

3. Identify Potential Participants at Gaming Devices

In Step S12, potential participants at gaming devices are identified. The slot server 102 (and/or a focus group service provider server 118) may match player information in the player database 210 to a marketer's focus group definition in the focus group database 212. If the information matches, then the player may be considered as a candidate to join the focus group. For example, if Burger King® defines a focus group that requires a respondent between 25 and 35 years of age, and Joe Smith is 29 years of age, then Joe Smith is eligible to participate in Burger King®'s focus group.

The slot server 102 (and/or a focus group service provider server 118) may impose additional constraints on selecting players beyond the constraints of a marketer's focus group definition. For example, the slot server 102 may select focus group participants from among only players that have lost a certain amount of money; players who have lost on a certain number of consecutive pulls; players with a certain theoretical win value; and/or players who have not won during a given time period. Such players may be more likely to agree to participate in focus groups, and the compensation provided to the players may ultimately find its way back to the slot server 102. The slot server 102 may or may not disclose these additional constraints to the marketer.

Identifying participants for focus groups may be an ongoing process. This is because focus groups may continually add new people and lose other people. Reasons for removing a participant from a focus group may include: the participant has contributed too little to the discussion; the participant has ceased to contribute; the participant has dominated the discussion; the participant has been overly critical or influential of others in the group; the participant has been with the group for a set amount of time; the discussion has stagnated; the participant has been randomly chosen to be removed; other players have become eligible to join the group; the participant has ceased to gamble or otherwise contribute to the casino's profitability; the marketer has learned what he wanted to learn; the participant has received a preset allotment of compensation; and the participant has requested to leave the focus group, and, in some cases, a replacement has been found. In addition to the aforementioned reasons, reasons for adding a player to a focus group may include: the focus group has lost a member; the focus group discussion has stagnated; the player has been deemed to be insightful; the player has been chosen at random; and the player has indicated an interest in joining the focus group.

4. Communicate the Topic to the Participants

In Step S13, the topic is communicated to the participants. In some embodiments, a topic for discussion may be transmitted via an Internet link connecting the slot server 102 (and/or a focus group service provider server 118) to the participants' gaming devices 104, 106, 108. However, a number of other modes of transmission are possible as indicated above. Once the topic has been received, the gaming device 104 may display the topic to the participant. A topic may be displayed, for example, on a display screen 312 which may include an LCD display, cathode ray tube display, and/or player tracking device display connected to gaming device 104. Alternatively or additionally, a gaming device 104 may audibly communicate the topic to a participant via an audio output device 310 such as, for example, an audio speaker.

Prior to communicating the topic to the participant, in some embodiments the gaming device 104 may ask the player whether he is willing to participate in the focus group. The gaming device 104 may also communicate to the player an offer of compensation in return for participating in the focus group. In particular, the gaming device 104 may offer immediate compensation in the form of tangible value. The compensation may be offered both for participating in the focus group as a group member, and/or for individual instances of participation, such as for making comments. The gaming device 104 may further communicate conditions that are necessary to satisfy in order to be permitted to participate in the focus group. For example, the participant may be required to discuss the topic truthfully and thoughtfully. If a player does not agree to participate in the focus group, the player's gaming device 104 may so inform the slot server 102 (and/or the focus group service provider server 118), and the slot server 102 may then select a substitute player to participate in the focus group. In some embodiments, a gaming device 104 may provide an alternate and/or more generous offer of compensation to a player who has declined to participate in a focus group. This may be done in the hope of getting the player's agreement. In other embodiments, players are selected to participate in focus groups only if they have previously indicated a willingness to do so. In such embodiments, the need to ask whether players would care to participate is eliminated.

5. Relay Participant and Moderator Inputs

In Step S14, the participant and moderator inputs to the focus group discussion are relayed to each other. The participant may provide input to a focus group in a number of ways. For example, these may include keying in comments to a touch-screen or keypad connected to the gaming device 104, voicing comments into a microphone (possibly to an IVR system), or motioning comments into a camera. The keypad connected to the gaming device 104 may be the standard "qwerty" keypad, or may consist of only a few buttons, such as an "I Agree" button and an "I want to speak" button.

The gaming device 104 receives the participant comments and transmits them to the slot server 102 (and/or a focus group service provider server 118). Transmission may occur via Internet link or via a number of other modes of communication. The slot server 102 may then relay the participant comments to the moderator via the moderator terminal 112 and to other members of the focus group via the gaming devices 106, 108. Participant comments may also be relayed to players not currently participating in the focus group. By watching the focus group in progress, non-participants may be encouraged to join. Participant comments may also be relayed to participants at conventional Internet nodes, not at gaming devices.

In some embodiments, the participant signals his intention to comment or to otherwise participate in the focus group. For example, the participant may press an "I want to speak" button on the gaming device 104 that signals the moderator or slot server 102. Alternatively, a participant may vocally indicate a desire to speak and the gaming device 104 equipped with a voice recognition facility may signal the moderator in response. The moderator may subsequently give the participant permission to speak by pressing a "clear to speak" button 602 that sends a signal to the participant's gaming device 104. This signal may, for example, activate a green "go ahead" light on a participant's gaming device 104. The participant may then speak. His comments and image may be transmitted to the slot server 102, from which they may be relayed to all members of the focus group. When the participant is done speaking, he may press a "done speaking" button on the gaming device 104. The "done speaking" button may transmit a signal to the slot server 102 which may then relay the signal to the moderator. The moderator may then clear a new participant to speak. If a participant attempts to speak when the moderator has not cleared him to speak, the participant's comments may not be broadcast to other focus group participants. However, in some embodiments, the image of the participant's lips moving may be broadcast.

In some embodiments, participants may all comment at the same time. For example, textually represented participant comments may be displayed chronologically for all members of a focus group to see. In some embodiments, the moderator may allow multiple participants to communicate at once. This might occur, for example, if two participants in particular are arguing back and forth.

Focus group participants may be provided with a number of specialized channels and/or controls for communication. These may include, for example, an "I accept" button for agreeing to participate in a focus group; an "I want to speak" button for communicating to the moderator a desire to speak; an "I agree" button for communicating agreement with what has been said by other participants or the moderator; an "I disagree" button for communicating disagreement with what has been said by other participants or the moderator; a 'Cut him off' button for signaling that one participant has been talking too long; a "Pay him" button for expressing the opinion that a fellow focus group participant should be paid for making a good comment; an "I quit" button for exiting the focus group; and a "done speaking" button for communicating to the moderator that the participant is finished speaking.

Use of these channels may be recorded by the slot server 102 and corresponding "meta-tags" may be responsively inserted into the audio-video feeds/recordings of the focus group's discussion. The term meta-tag is used herein to refer to a label associated with a segment of a audio-video feed or recording. The meta-tag may simply be an identification number that points to a record in a database that stores details about the associated segment or, for example, it may be the actual name of the participant that made a comment within the associated segment. In some embodiments, these meta-tags may be used to identify and/or locate a participant's comments and/or correlate a participant comment with the stimulus that triggered the comment.

Using a GUI 600 such as that pictured in FIG. 6, the moderator may communicate a number of signals to the slot server 102. These signals may include clearing a participant to speak, cutting a participant off from speaking, eliminating a participant from the focus group, asking a new player to join the focus group, and compensating a participant. In addition, the moderator may pose a question, response, or other comment to one or more participants. The moderator may also communicate an image, sound, or other piece of information for participants to consider. For example, the moderator may communicate a picture of a pair of shoes and ask for the participants' opinions on the appearance of the shoes. The slot server may relay any signals from the moderator to the participants.

The moderator may communicate in many of the same ways that a participant may. For example, the moderator might employ a microphone; cameras, key pads, touch screens, and so on. The moderator may have a number of specialized channels and/or controls for communication. These may include, for example, a "Clear to speak" button 602; a "Cut him off" button 604; a "Drop him from the group" button 606; a "Get new participant" button 608; a "Send comment" button 610; a "Send image" button (not pictured); and a "Compensate him" button 612 as indicated in FIG. 6. In addition, buttons for designating a particular participant 614 may be provided. For example, the "Joe Smith" button, or the "Person 3" button may appear on a touch-screen so that the button labels may change when the names of focus group participants change. In some embodiments, two buttons may be used in conjunction. For example, the "Clear to speak" button may be used in conjunction with the "Joe Smith" button so as to indicate who it is that is cleared to speak.

In addition to communication controls, the moderator may have access to visual or other representations of important focus group parameters. For example, the moderator may see a visual representation of who has spoken; how long each participant has spoken; what other participants have said about a particular participant or his comment (e.g. "I agree [with what he said]"), each participant's gambling history and/or performance; each participant's demographic information; and how much compensation has been given to each participant.

The visual information available to the moderator may aid the moderator in deciding how to proceed. In particular, the visual information may help the moderator in awarding discretionary compensation to participants. For example, the moderator may be permitted to award up to a fixed maximum amount of cash to each focus group participant. The visual information available to the moderator may show the moderator how much has already been awarded to each participant, and therefore, how much is available still to award.

6. Verify Participation

In Step S15, the participation of the members of the focus group is verified. In some embodiments, the moderator or the slot server 102 (and/or a focus group service provider server 118) confirms a player's participation in a focus group before providing compensation. Verification of participation may include, for example, receiving a signal from a player signifying the player's agreement to participate in the focus group; receiving comments from the participant; receiving comments from the participant that are relevant to the focus group's topic of discussion; and visual information displayed to a moderator may provide an indication of who has participated and whom should be compensated. In some embodiments, the moderator or the slot server 102 may pose specific questions to a participant to test whether the participant is paying attention. For example, an "I disagree" response to the stimulus "The earth is round" may indicate a player is not fully participating. Video images of the participant captured via a camera 314 may also be used to determine if the player is merely pressing response buttons randomly or is actually making conscious decisions in response to the focus group stimulus.

7. Transmit a Signal to Provide Tangible Value as Compensation for Participation In Step S16, a signal is transmitted to compensate the focus group member for his participation. Upon receiving a signal from the moderator to compensate a participant, the slot server 102 (and/or a focus group service provider server 118) may signal a participant's gaming device 104 to compensate the participant. The signal may include instructions on how much compensation or on what form of compensation should be given to the participant. Compensation given to a participant may include, for example, cash; credits; gambling tokens; reward points; increased odds of winning; increased prize amounts; increased payouts in prize tables; insurance against losses; the ability to play dollar machines for a quarter; the free use of an extra coin in a multi-coin machine; the ability to play for free; having winnings rounded to a higher level (e.g. $85 rounded to $100); the enablement of extra prize-winning symbols on a gaming device 104; the enablement of extra pay lines on a gaming device 104; discounts on various products; more freedom to enter focus groups; more freedom to choose whom is in one's focus group; and auxiliary benefits such as free or subsidized meals or hotel rooms.

In some embodiments, the slot server 102 may not receive an explicit signal from the moderator to compensate participants. Rather, the slot server 102 may use a set of rules 820 for determining participants' compensation. The following rules or criteria may be used by the moderator or slot server to determine participant compensation. A participant may be compensated when, for example, the participant has agreed to join the focus group; the participant has joined the focus group; the participant has completed the focus group; the participant has participated by making comments in the focus group; the participant has been in the focus group for a set period of time; other focus group participants have voted that the participant should receive compensation; other focus group participants have agreed with the comments of the individual participant; other participants make comments based upon the comments of the individual participant; the participant has contributed good ideas; the participant has contributed original ideas; the participant has contributed truthfully and/or thoughtfully; the participant has brought the focus group through a road block in the discussion; and/or the participant has built upon a previously made comment. The current participant database 216 that stores records of the comments contributed by the participants may be useful in identifying when a comment satisfies any of the above-listed criteria.

Compensation may be given to participants at the end of the focus group, or it may be given to participants as they earn it. For example, every good comment, or even every comment, might earn a participant immediate compensation. Earned compensation may be large, as in the tens of dollars range, or may be small, as in the cents range. Compensation earned during a focus group may come from a discretionary fund provided to the moderator for compensating participants who have been especially helpful. The amount of compensation provided may be related to the participant's gambling performance. In other words, the moderator or slot server 102 may determine that there is an amount and rate of compensation that will keep a focus group participant playing a slot machine for a longer period of time such that the casino's actual win exceeds the cost of compensating the participant. Compensation earned throughout the duration of a focus group may be paid immediately, or may appear graphically on the participant's gaming device in the form of credits to be paid out at the end of the focus group.

The amount of compensation given may suffice to reduce or eliminate a participant's gambling losses for the present gambling session; for a certain number of gambling sessions; or for a certain time period. Such losses may be tracked via a player tracking card, via a gaming device's record of a session, or via the observation of a participant by casino employees. The prospect of eliminating gambling losses already incurred is a powerful motivating force for a player to participate in focus groups.

F. ADDITIONAL EMBODIMENTS OF THE INVENTION

The following are example alternative variations which illustrate additional embodiments of the present invention. It should be understood that the particular variations described in this section can be combined with the different embodiments, or portions thereof, described above in any manner that is practicable. These examples do not constitute a definition or itemization of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

1. Alternate or Additional Method Steps

The present invention may include the additional step of communicating the results of the focus group to the marketer. For example, the marketer may be provided with a transcript of the focus group proceedings. Some examples of desired formats for communicating results to the marketer are listed under the deliverable field 814 of the focus group database 212 of FIG. 8. As indicated above, these deliverables may include such things as a transcript of the focus group, a video recording of each of the participants, and/or a summary of the group's opinion on issues related to the topic.

The present invention may include the additional step of receiving compensation from the marketer in return for conducting a focus group.

Groups of marketers may collaborate to share, trade, or sell information or results received from a focus group. The slot server itself may sell information to one or more marketers. For example, the slot server may conduct focus groups even if a marketer has not requested that such groups be conducted. The slot server may then sell records of the focus group to the marketer. In some embodiments, the slot server and the marketer may be the same entity.

The moderator may be a human operator or a program controlled computer. As suggested above, the moderator program may reside and/or execute at the slot server 102.

2. Devices/Places for Focus Groups

In addition to being conducted at gaming devices 104, focus groups may be conducted at vending machines, ATM's, POS terminals, juke boxes, kiosks, pay phones, Rio®-type players, or any other devices capable of dispensing immediate, tangible benefits and/or tangible value. Focus groups may be conducted via portable devices, such as PDAs. A participant may then have the option of standing by an ATM machine, for example, and receiving immediate compensation for participating. However, the participant need not necessarily be proximate to a machine that dispenses tangible benefits. Portable devices might themselves be small gaming devices 104.

Using POS terminals, for example, focus groups may be conducted at any point of purchase, either on-line or off-line. Compensation received from participation in the focus group may apply towards an immediate discount or rebate on a purchased product.

Focus groups may also be held in person in a room of a casino. Participants may then have compensation delivered to them or automatically added to their player accounts. Compensation added to player accounts may be dispensed to participants via a gaming device 104 as soon as they sit back down at the gaming device 104 and identify themselves. Alternatively, the room may include gaming devices 104 in communication with a slot server 102 and a moderator terminal 112. While the focus group is conducted, the participants continue to play the gaming devices 104. The moderator may use the gaming devices 104 to immediately deliver compensation for the participants' comments.

In yet another embodiment of the present invention, focus groups may be conducted around a table game or other casino game. For example, a focus group may be held at a roulette table while the group gambles. A focus group moderator may work with a croupier using I/O devices connected to networked terminals. Using a GUI 600, the moderator may signal the croupier to payout tokens to players based on their participation in the focus group. In other words, the croupier may have a display in front of him that directs him to pay the participants specific amounts of compensation as determined by the moderator, marketer, and/or slot server 102. In some embodiments, the participants may have displays and cameras in front of them to be used as an audio-video aid in conducting the focus group as described elsewhere herein.

3. Profitability

To avoid the focus groups from negatively impacting a casino's revenue, a player's gaming device 104 may be disabled for conducting focus groups if the player's rate of play 710 is or has been below certain threshold. Rate of play may entail a rate of pulls or a rate of wagering money. In some embodiments, a gaming device 104 may tolerate a slower rate of play if it (or the slot server) receives compensation from, say, the marketer. A casino employee or an administrator of the slot server may have access to an on/off switch with the capability of disabling or enabling gaming devices 104 for conducting focus groups. The switch may be thrown depending on casino customer traffic. The switch may also be triggered automatically. During slow periods, enabling gaming devices 104 to conduct focus groups may serve to attract gamblers to the casinos or gaming devices 104. Focus groups may also serve to take a gambler's mind off the size of his bets and/or losses.

In some embodiments, focus groups may be conducted only at times that do not interfere with a player's gambling. Thus, a player may be asked to participate in a focus group only when the player's gaming device 104 is dropping coins into the gaming device's tray, or when the reels of a slot machine are spinning, or when the gaming device's coin hopper is being refilled. The player may put the gaming device 104 into automatic play mode while in the focus group, so as to gamble and participate simultaneously. Methods for enabling an automatic play gaming device are disclosed in U.S. Pat. No. 6,012,983, filed Dec. 30, 1996, entitled "Automated Play Gaming Device," which has been incorporated herein by reference.

In some cases, the focus group may take priority over gambling, and the gaming device might be temporarily disabled for part or all of the duration of the focus group to encourage player attentiveness.

4. Noise

Gaming devices 104, or the slot server 102, may be in connection with microphones capable of measuring the noise levels at different places in a casino. If the focus group requires either listening or verbal comments, the slot server may select players for focus groups based in part on their ability to hear the discussion or on the gaming device's ability to record their answers in the presence of noise. Even if audio is not involved, players may still be selected based on the degree to which background noise might distract them from the focus group discussion. In a noisy environment, a focus group participant may use a headset to communicate with other members of the group. Putting on a headset may signal a participant's intention or desire to participate in a focus group.

5. Bias

Players may be limited to a certain number of focus groups per day (or other time period) so as to prevent them from becoming biased "professional" focus group participants. Bias may be detected in or inferred from a player's participation based on a number of factors. A focus group participant who has lost money may be biased and thereby express opinions that he thinks will earn him money. If a casino is crowded, for example, a participant may give answers that please his neighbors rather than express his own opinion. A participant who has had much alcohol and/or caffeine to drink, who has been awake for a long time, who has been winning, and so on, may similarly be biased. Software in gaming devices 104 may be configured to detect when a player might be biased and to report the bias to either, the slot server, moderator, or marketer. Furthermore, software present with the slot server may analyze the comments of large numbers of focus group participants, analyze factors which may cause these participants to be biased, and infer what sorts of bias might result from which factors. For example, if players who have expressed very strong negative opinions have tended to be those who have also lost a significant sum of money, the slot server may infer that players who have lost a significant sum of money will tend to be biased towards expressing negative opinions.

One type of bias is a participant's attentiveness. Gaming devices 104 may be equipped with means for detecting whether a participant is paying attention to the discussion in a focus group. A camera may track the participant's gaze, bio-metric equipment may track physiological responses, and timers may track the regularity of the participant's responses to questions posed to the group. The participant may not receive full compensation or may be otherwise penalized if he is determined not to be paying adequate attention.

The slot server 102 may monitor participants but may not be configured to impose penalties on its own. The slot server may submit to moderators and/or marketers records of the participant participating in the focus group. For example, if a marketer wishes to watch the participant as he participates in the focus group, the slot server 102 may provide to the marketer video recordings of the participant. The marketer may wish to verify the participant's attentiveness or may wish to verify the participant's age information.

Many casinos already use cameras extensively in order to discourage or detect cheating. Such cameras are often attached to the ceiling. While the present invention may be implemented using cameras 314 coupled directly to the gaming devices 104, cameras may be used just as effectively separated from the gaming devices 104.

6. Initiating Participation

Players may automatically make themselves available to participate in focus groups. For example, a player tracking card may indicate that the player is always willing to participate. Players may then be invited to participate in focus groups as needed. In other words, a player's willingness to participate may be a preference stored on a casino membership, a player tracking, and/or a slot club card.

In some cases, the potential to earn money through focus groups may be given as a reward to players for a number of behaviors, including maintaining a certain play rate, frequency of slot pulls, betting a certain amount, and so on. For example, a player who has bet continuously for two hours may be rewarded with an offer to join a focus group and receive $15 for his participation. In some embodiments, compensation and/or an offer to participate in a focus group may be presented to participants at times when they might otherwise leave the casino or a gaming device 104.

In some embodiments, potential participants might become eligible for a focus group only after performing a qualifying action. For example, participants might be presented with a television program for required viewing in their hotel rooms before being allowed to participate in a focus group. The moderator or slot server may then test the participants to see whether they have, in fact, performed the qualifying action. The focus group may then discuss the content of the television program, perhaps discussing whether the program could be turned into an interesting soap opera.

If the focus group discusses a particular item or product, the physical product might be provided to focus group participants at the casino. Likewise, if a marketer desires that the participants use the product before participating in the focus group, prior use of the product may be a qualifying action.

Players may also be invited to focus groups based on experiences prior to entering the casino, as revealed on a player tracking card. The player tracking card need not merely track gambling statistics, but may serve other functions outside of a casino. For example, it may serve as a frequent shopper card. Thus, any information contained on the card that is used in its frequent shopper card capacity, such as what groceries the player buys, may also be used to identify players who are desirable for a particular focus group. The same information may be used to add weight to the opinions of a particular participant. For example, a participant who buys dog food will weigh more heavily with a marketer in a discussion relating to dogs. In embodiments that employ POS terminals, a frequent shopper card may serve as the only means of obtaining player information for focus groups.

Players may even be paid to further reveal experiences via their player tracking cards. For example, players may be paid by increasing the balance on their player tracking cards. The player tracking cards could then be used by the players as credit cards. This would provide marketers with more information about players' financial status.

Rather than, or in addition to, looking to a player's tracking card, a gaming device 104 may request player information directly prior to asking the player to participate in a focus group. The gaming device 104 or the slot server 102 may then use the player information in determining whether and under what circumstances to invite the player to participate in the focus group.

In some embodiments; participants may join or even complete a focus group without being told the purpose of the group. In other words, the topic that the marketer is truly interested in may not be disclosed. The participants may be asked questions on a wide range of different topics to conceal the marketer's intent.

7. Negotiation

If a gaming device 104 (or slot server 102 via a gaming device 104) has asked a player whether he wishes to participate in a focus group, and the player has declined, then a negotiation process may commence where the gaming device 104 attempts to induce the player to change his mind and participate. In some embodiments, the gaming device 104 repeatedly displays compensation offers until the player agrees to accept the compensation in exchange for participating in the focus group. The gaming device 104 might store a rules database indicating what offers to display in light of the player's information and gambling history, the focus group requirements, the likelihood of other qualified players being found, the profit margin on the focus group, and other offers previously accepted or declined by the player. Once the player has declined a specified number of times, new offers may no longer be presented.

In other embodiments, rather than present ng particular offers, the gaming device 104 may provide the player a means to indicate suitable offers. For example, the gaming device 104 might allow a player to select between receiving cash or receiving free plays. If the player then chooses free plays, the gaming device 104 may ask the player how many free plays, or may begin making offers of particular numbers of free plays.

In still other embodiments, the player may have the opportunity to specify a desired compensation, after which the gaming device 104 may inform the player of what he must do in return. The player may then either accept the offer, or may modify his desired compensation, after which the process may repeat.

Focus groups may be categorized into such levels as "gold", "silver", and "bronze" according to the compensation provided for participating in each group. Players may similarly be categorized according to their eligibility for participating in each level of focus group. By participating in a number of focus groups, players may work their way up from being bronze participants to becoming gold participants.

Marketers or moderators may bid to get certain players to participate in their focus groups. Proceeds of the bidding may go to the participant, to the slot server, or to the casino housing the participant.

A participant may be given a number in a queue indicating when he may speak. As each participant in front of him finishes, his number may go down. Alternatively, the images of those scheduled to speak soon may appear in a circle, designated as an "on deck" circle. Other methods may be used to indicate future speakers.

8. Relating Gambling to Focus Groups

There are a number of ways to combine the process of gambling and the process of participating in a focus group into a unified experience. Compensation may be given to focus group participants in the appearance of gambling winnings. For example, a participant might win on five plays of the gaming device 104 where he otherwise would not have. In another possible combination, the prize tables of a focus group participant's gaming device 104 may depend on some parameters of the focus group. For example, if the participant has contributed positively to the focus group, the gaming device 104 may pay out greater prizes. Such combinations may be implemented by defining a compensation structure that ties providing compensation to gambling.

Participation in the same focus group may also link the gambling fortunes of participants. For example, focus group participants may gamble as a team and consequently receive the largest prize won by any member of the focus group during a given time period. Participants may compete for a progressive jackpot particular to the focus group, or particular to a plurality of different focus groups.

9. Allowing Players to Speak

During a lively focus group, many participants may wish to speak at once. There are a number of possible ways for managing participant inputs. In some embodiments focus group participants are allowed to speak based on their gambling performance. For example, the participant who wins the most on a particular spin may be allowed to speak. Another way involves the moderator or marketer assigning a value or rank to focus group participants. The ranks may be assigned arbitrarily, or based on the perceived value of participants to the discussion. Then, when several participants wish to speak at once, the moderator may clear to speak the participant with the highest rank.

In order to encourage a bashful participant, a moderator may compensate the participant before he speaks in order to get him to speak. This may occur with participants whom the moderator thinks will make valuable contributions. For example, in a focus group discussing the design of a new sports car, the moderator may award a current sports car-owning participant $2 and then ask him to comment on the sleekness of the car's profile.

If many participants do speak at once, participants' comments may not be immediately broadcast to the rest of the focus group because. However, comments not broadcast may be saved and broadcast later, or may be saved merely for the benefit of the moderator or the marketer. The moderator may thank or otherwise acknowledge a participant even if his comments do not appear before the rest of the group.

If a focus group discussion is particularly lively, a marketer who has requested that a focus group last for a certain period of time, may request that the duration of the group be extended. The marketer may make an additional offer of payment to the slot server in return for extending the dura on of the focus group.

10. Other Embodiments

In some embodiments, a person may participate in multiple focus groups at once. The person may use multiple gaming devices 104, or a single gaming device 104 with a divided interface screen to the different focus groups. The compensation awarded per focus group may be less for someone participating in multiple focus groups.

In some embodiments, the benefits a participant receives for participating in a focus group may persist after the focus group ends. For example, the participant may receive better odds at a gaming device 104 for an entire day after participating. The participant may maintain his benefits by participating in focus groups on a regular basis.

In some embodiments, a marketer may wish to offer a participant an uncertain compensation, but not bear the risk associated with such an offer. For example, the marketer might want to double each payout of the prize table. However, the marketer may not want to pay out an additional million dollars if the participant wins a million-dollar jackpot. Therefore, the marketer may pay the casino, through the slot server 102, a fixed amount of money in order for the casino to assume the burden of doubling the payouts. The fixed amount may be determined by calculating the participant's expected additional prizes resulting from the doubled payouts. In other embodiments, the marketer may pay an insurance provider to assume the burden of doubling the payouts.

One advantage of a focus group conducted amongst participants in separate locations is that the moderator may communicate with the participants individually. In some embodiments, the moderator may test a first participant's sincerity or response to peer pressure by telling every other participant to express a certain opinion, and seeing whether the first participant then expresses an opinion in conformance with the others.

In some embodiments the marketer and the moderator may be the same party. In others they may be different. If they are different, then the moderator may conduct a focus group under general guidelines set by the marketer. These guidelines may include how much total compensation to award to participants, and how much compensation to award to individual participants. The slot server 102 or the marketer may compensate the moderator for running the focus group.

G. CONCLUSION

It is clear from the foregoing discussion that the disclosed systems and methods to conduct focus groups represents an improvement in the art of market or opinion research. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

The invention is claimed as follows:

1. A gaming system comprising:

a display device, at least one input device, at least one processor, and at least one memory device which stores a plurality of instructions, which when executed by the at least one processor, cause the at least one processor to operate with the display device and the at least one input device to:

(a) identify a player;

(b) enable the identified player to place a wager on a play of a game, (c) for the wagered on play of the game:

(i) randomly determine a game outcome, (ii) display, in a first divided portion of the display device, the randomly determined game outcome, (iii) determine any award associated with the randomly determined game outcome, and (iv) display, in the first divided portion of the display device, any determined award associated with the randomly determined game outcome, and (d) in addition to the play of the game, display, in a second, different divided portion of the display device, a non-wagering activity, said non-wagering activity being:

(i) based on the identification of the player, (ii) independent of any wager placed on any play of any game, (iii) independent of any randomly determined game outcome displayed in the first divided portion of the display device, and (iv) independent of any award associated with any randomly determined game outcome displayed in the first divided portion of the display device.

2. The gaming system of claim 1, wherein when executed by the at least one processor, the plurality of instructions cause the at least one processor to enable the identified player to participate in the non-wagering activity displayed in the second, different divided portion of the display device.

3. The gaming system of claim 2, wherein when executed by the at least one processor, the plurality of instructions cause the at least one processor to associate a benefit with the identified player based on the participation in the non-wagering activity, said benefit being independent of any award associated with any randomly determined game outcome displayed in the first divided portion of the display device.

4. The gaming system of claim 3, wherein the benefit is selected from the group consisting of: an amount of currency, a quantity of gambling tokens, an increased odds of winning at least one play of at least one game, an insurance against losses of at least one play of at least one game, at least one play of at least one game associated with a first denomination in exchange for currency having a second denomination, the second denomination lower than the first denomination, at least one free play of at least one game, an activation of at least one symbol associated with at least one play of at least one game, an activation of at least one symbol combination associated with at least one play of at least one game, and an activation of at least one pay line associated with at least one play of at least one game.

5. The gaming system of claim 1, wherein the player is identified in association with a player tracking system.

6. The gaming system of claim 1, wherein the non-wagering activity is a focus group.

7. The gaming system of claim 1, which includes a housing, and a plurality of input devices supported by the housing, said plurality of input devices including an acceptor, and a cashout device, wherein when executed by the at least one processor, the plurality of instructions cause the at least one processor to operate with the plurality of input devices to: if a physical item is received via the acceptor, establish a credit balance based, at least in part, on a monetary value associated with the received physical item, and if a cashout input is received via the cashout device, cause an initiation of any payout associated with the credit balance.

8. A method of operating a gaming system, said method comprising:

(a) causing at least one processor to execute a plurality of instructions to identify a player;

(b) enabling the identified player to place a wager on a play of a game, (c) for the wagered on play of the game:

(i) causing the at least one processor to execute the plurality of instructions to randomly determine a game outcome, (ii) causing a display device to display, in a first divided portion of the display device, the randomly determined game outcome, (iii) causing the at least one processor to execute the plurality of instructions to determine any award associated with the randomly determined game outcome, and (iv) causing the display device to display, in the first divided portion of the display device, any determined award associated with the randomly determined game outcome, and (d) in addition to the play of the game, causing the display device to display, in a second, different divided portion of the display device, a non-wagering activity, said non-wagering activity being:

(i) based on the identification of the player, (ii) independent of any wager placed on any play of any game, (iii) independent of any randomly determined game outcome displayed in the first divided portion of the display device, and (iv) independent of any award associated with any randomly determined game outcome displayed in the first divided portion of the display device.

9. The method of claim 8 which includes enabling the identified player to participate in the non-wagering activity displayed in the second, different divided portion of the display device.

10. The method of claim 9, which includes causing the at least one processor to execute the plurality of instructions to associate a benefit with the identified player based on the participation in the non-wagering activity, said benefit being independent of any award associated with any randomly determined game outcome displayed in the first divided portion of the display device.

11. The method of claim 10, wherein the benefit is selected from the group consisting of: an amount of currency, a quantity of gambling tokens, an increased odds of winning at least one play of at least one game, an insurance against losses of at least one play of at least one game, at least one play of at least one game associated with a first denomination in exchange for currency having a second denomination, the second denomination lower than the first denomination, at least one free play of at least one game, an activation of at least one symbol associated with at least one play of at least one game, an activation of at least one symbol combination associated with at least one play of at least one game, and an activation of at least one pay line associated with at least one play of at least one game.

12. The method of claim 8, wherein the player is identified in association with a player tracking system.

13. The method of claim 8, wherein the non-wagering activity is a focus group.

14. The method of claim 8, wherein a credit balance is increasable based on any determined award associated with the randomly determined game outcome, said credit balance being increasable via an acceptor of a physical item associated with a monetary value, and said credit balance being decreasable via a cashout device.

15. The method of claim 8, which is provided through a data network.

16. The method of claim 15, wherein the data network is an internet.

* * * * *